(12) United States Patent
Sohacki

(10) Patent No.: US 11,807,344 B2
(45) Date of Patent: Nov. 7, 2023

(54) GYROSCOPIC ROLL STABILIZER WITH FLYWHEEL CAVITY SEAL ARRANGEMENT

(71) Applicant: WaveTamer LLC, Greenville, NC (US)

(72) Inventor: Brian John Sohacki, Livonia, MI (US)

(73) Assignee: WAVETAMER LLC, Greenville, NC (US)

( * ) Notice: Subject to any disclaimer, the term of this patent is extended or adjusted under 35 U.S.C. 154(b) by 0 days.

(21) Appl. No.: 18/029,319

(22) PCT Filed: Sep. 29, 2021

(86) PCT No.: PCT/US2021/052561
§ 371 (c)(1),
(2) Date: Mar. 29, 2023

(87) PCT Pub. No.: WO2022/072433
PCT Pub. Date: Apr. 7, 2022

(65) Prior Publication Data
US 2023/0271680 A1    Aug. 31, 2023

Related U.S. Application Data

(60) Provisional application No. 63/085,349, filed on Sep. 30, 2020.

(51) Int. Cl.
*B63B 39/04* (2006.01)
*F16C 3/02* (2006.01)
*B63B 3/04* (2006.01)

(52) U.S. Cl.
CPC . *B63B 3/04* (2013.01); *F16C 3/02* (2013.01)

(58) Field of Classification Search
CPC .................................. B63B 39/04; F16C 3/02
(Continued)

(56) References Cited

U.S. PATENT DOCUMENTS 2,795,142 A   6/1957   Smith
3,051,533 A   8/1962   Brass
(Continued)

FOREIGN PATENT DOCUMENTS

BR   PI0707129-9 B1   7/2018
CN   1484739 A        3/2004
(Continued)

OTHER PUBLICATIONS

United State Statutory Invention Registration, Reg. No. H312, Published Jul. 7, 1987, Rotating Anode X-Ray Tube, Parker.

*Primary Examiner* — Daniel V Venne
(74) *Attorney, Agent, or Firm* — COATS & BENNETT, PLLC

(57) ABSTRACT

A gyroscopic roll stabilizer for a boat includes a flywheel shaft having a first end and an opposite second end. The flywheel shaft has first and second open-ended cavities formed on opposing ends. A first uneven seal encloses the first cavity, and a second uneven seal encloses the second cavity. The first and second uneven seals are both configured to provide asymmetric sealing such that greater resistance is provided against flow in a primary sealing direction, from a first side toward a second side, than in a secondary sealing direction, from the second side toward the first side. The first side of the second seal faces inward toward the second cavity, and the second side of the first seal faces inward toward the first cavity. The first and second seals are functionally inverted relative to each other. Related methods are also disclosed.

18 Claims, 16 Drawing Sheets

(58) Field of Classification Search
USPC .......................................................... 114/122
See application file for complete search history.

(56) References Cited

U.S. PATENT DOCUMENTS

| | | | |
|---|---|---|---|
| 3,260,872 | A | 7/1966 | Potter |
| 3,844,341 | A | 10/1974 | Bimshas, Jr. et al. |
| 4,165,472 | A | 8/1979 | Wittry |
| 4,304,296 | A | 12/1981 | Shaffer |
| 4,602,874 | A | 7/1986 | Neugebauer |
| 5,054,583 | A | 10/1991 | Wrzyszczynski |
| 5,207,408 | A * | 5/1993 | Burg ................ B63B 29/12 114/284 |
| 6,144,128 | A | 11/2000 | Rosen |
| 6,175,172 | B1 | 1/2001 | Bakholdin et al. |
| 6,373,394 | B1 | 4/2002 | Zhang |
| 6,566,775 | B1 | 5/2003 | Fradella |
| 6,913,390 | B2 | 7/2005 | Inoue et al. |
| 6,959,756 | B2 | 11/2005 | Woodard et al. |
| 6,973,847 | B2 | 12/2005 | Adams et al. |
| 7,458,329 | B2 * | 12/2008 | Nedwed ............. B63B 39/04 114/122 |
| 7,546,782 | B2 | 6/2009 | Adams et al. |
| 8,117,930 | B2 | 2/2012 | Adams et al. |
| 8,899,166 | B2 | 12/2014 | Steinmann et al. |
| 10,794,699 | B2 | 10/2020 | Miocevich et al. |
| 10,989,534 | B2 | 4/2021 | Miocevich et al. |
| 11,427,289 | B2 | 8/2022 | Smith et al. |
| 11,428,530 | B2 | 8/2022 | Salutari |
| 11,440,629 | B2 | 9/2022 | Peterson |
| 2003/0100376 | A1 | 5/2003 | Friedmann et al. |
| 2003/0184176 | A1 | 10/2003 | Steinmeyer |
| 2003/0221626 | A1 | 12/2003 | Eavitt et al. |
| 2004/0080218 | A1 | 4/2004 | Weidman et al. |
| 2004/0164495 | A1 | 8/2004 | Oldenburg |
| 2004/0244513 | A1 | 12/2004 | Adams et al. |
| 2005/0040776 | A1 | 2/2005 | Sibley |
| 2007/0157749 | A1 | 7/2007 | Adams et al. |
| 2008/0303363 | A1 | 12/2008 | Alston |
| 2009/0301373 | A1 | 12/2009 | Adams et al. |
| 2010/0109341 | A1 | 5/2010 | Fullerton |
| 2010/0320333 | A1 | 12/2010 | Martin |
| 2011/0209568 | A1 | 9/2011 | Anderson |
| 2013/0036959 | A1 | 2/2013 | Steinmann et al. |
| 2014/0245939 | A1 | 9/2014 | Nohara et al. |
| 2017/0009845 | A1 | 1/2017 | Arseneaux et al. |
| 2018/0034344 | A1 | 2/2018 | Hitchcock et al. |
| 2018/0051988 | A1 | 2/2018 | Miocevich et al. |
| 2018/0269743 | A1 | 9/2018 | Buttner et al. |
| 2019/0367137 | A1 | 12/2019 | Smith et al. |
| 2019/0367138 | A1 | 12/2019 | Smith et al. |
| 2020/0317308 | A1 | 10/2020 | Peterson |
| 2020/0400432 | A1 | 12/2020 | Miocevich et al. |
| 2021/0171165 | A1 | 6/2021 | Skaun |
| 2021/0231437 | A1 | 7/2021 | Salutari |
| 2021/0269127 | A1 | 9/2021 | Sohacki et al. |

FOREIGN PATENT DOCUMENTS

| | | |
|---|---|---|
| CN | 101443987 A | 5/2009 |
| CN | 102810943 A | 12/2012 |
| CN | 104578595 A | 4/2015 |
| CN | 204408103 U | 6/2015 |
| CN | 105292395 A | 2/2016 |
| CN | 107757838 A | 3/2018 |
| CN | 207064483 U | 3/2018 |
| CN | 110131319 A | 8/2019 |
| DE | 19909491 A1 | 9/2000 |
| EP | 0458499 B1 | 7/1997 |
| EP | 2361833 A2 | 8/2011 |
| EP | 3339804 A1 | 6/2018 |
| FR | 1432057 A | 3/1966 |
| JP | 109144806 A | 6/1997 |
| JP | H09506310 A | 6/1997 |
| JP | H09263293 A | 10/1997 |
| JP | 2005503097 A | 1/2005 |
| JP | 2018028542 A | 2/2018 |
| WO | 9513647 A1 | 5/1995 |
| WO | 0202943 A1 | 1/2002 |
| WO | 03023942 A1 | 3/2003 |
| WO | 2009049371 A1 | 4/2009 |
| WO | 2014019322 A1 | 2/2014 |
| WO | 2016050534 A1 | 4/2016 |
| WO | 2019224322 A1 | 11/2019 |
| WO | 2019232371 A1 | 12/2019 |
| WO | 2022046508 A1 | 3/2022 |

* cited by examiner

GYROSCOPIC ROLL STABILIZER WITH FLYWHEEL CAVITY SEAL ARRANGEMENT

RELATED APPLICATIONS

This application claims benefit of U.S. Provisional Application No. 63/085,349, filed Sep. 30, 2020, the disclosure of which is incorporated herein by reference in its entirety.

TECHNICAL FIELD

The present disclosure relates generally to boat roll stabilizers for reducing the sideways rolling motion of a boat and, more particularly, to controlled moment gyroscopes for reducing the roll of a boat based on the gyroscopic effect.

BACKGROUND

The sideways rolling motion of a boat can create safety problems for passengers and crew on boats, as well as cause discomfort to passengers not accustomed to the rolling motion of the boat. A number of technologies currently exist to reduce the sideways rolling motion of a boat. One technology currently in use is gyroscopic boat stabilization for roll suppression, which is based on the gyroscopic effect. A control moment gyroscope (CMG) is mounted in the boat and generates a torque that can be used to counteract the rolling motion of the boat. The CMG includes a flywheel that spins at a high speed. A controller senses the attitude of the boat and uses the energy stored in the flywheel to "correct" the attitude of the boat by applying a torque to the hull counteracting the rolling motion of the boat.

Although, CMGs are gaining in popularity, particularly for smaller fishing boats and yachts, such devices are somewhat complicated to assemble correctly. For example, CMGs that utilize some forms of bearing cooling for the bearings supporting the flywheel that include having a low vapor pressure fluid disposed in or around end portions of the flywheel shaft, such as in cavities formed in the end portions of the flywheel shaft. Fully or partially filling these cavities with the low vapor pressure fluid, and sealing that fluid in the cavities as appropriate, may be challenging both during initial assembly, and during any rework/repair operations. Further, maintenance of desired pressure differentials across seals for the low vapor pressure fluid during operation of the CMG may be challenging.

Thus, there is a need for approaches to configuring control moment gyroscopes to allow for efficient assembly and/or repair, particularly in relation to filling and/or inspecting the cavities and/or sealing arrangements for bearing cooling systems.

SUMMARY

The present disclosure relates to a gyroscopic roll stabilizer for a boat that includes uneven seals that seal cavities in the flywheel shaft, such as to contain liquid heat transfer medium and/or some gas in the cavities, with a suitable pressure differential across the seals, and related methods. More particularly, the gyroscopic roll stabilizer includes a flywheel shaft having a first end and an opposite second end. The flywheel shaft has first and second open-ended cavities formed on opposing ends. A first uneven seal encloses the first cavity, and a second uneven seal encloses the second cavity. The first and second uneven seals are both configured to provide asymmetric sealing such that greater resistance is provided against flow in a primary sealing direction, from a first side (of the seal) toward a second side (of the seal), than in a secondary sealing direction, from the second side toward the first side. The first side of the second seal faces inward toward the second cavity, and the second side of the first seal faces inward toward the first cavity. Thus, the first and second seals are functionally inverted relative to each other. Related methods are also disclosed.

In one aspect, the present disclosure is directed to a gyroscopic roll stabilizer for a boat. The gyroscopic stabilizer includes an enclosure and a flywheel assembly. The enclosure is mounted to a gimbal for rotation about a gimbal axis and configured to maintain a below-ambient pressure. The flywheel assembly includes a flywheel and flywheel shaft. The flywheel has a first end and an opposite second end. The flywheel assembly is rotatably mounted inside the enclosure for rotation about a flywheel axis. The flywheel shaft has first and second open-ended cavities. The first open-ended cavity is formed in the first end and faces away from the second end. The second open-ended cavity is formed in the second end and faces away from the first end. A motor is operative to rotate the flywheel assembly. A first heat transfer shaft assembly is rotationally fixed relative to the flywheel axis and extends from the enclosure into the first cavity. A second heat transfer shaft assembly is rotationally fixed relative to the flywheel axis and extends from the enclosure into the second cavity. A first uneven seal extends between first heat transfer shaft assembly and the flywheel shaft to enclose the first cavity. A second uneven seal extends between second heat transfer shaft assembly and the flywheel shaft to enclose the second cavity. The first and second uneven seals are both configured to provide asymmetric sealing such that greater resistance is provided against flow in a primary sealing direction, from a first side toward a second side, than in a secondary sealing direction, from the second side toward the first side. The first side of the second seal faces inward toward the second cavity, and the second side of the first seal faces inward toward the first cavity. In some aspects, the gyroscopic roll stabilizer is such that:

- the first and second seals are physically asymmetric in a direction parallel to the flywheel axis; and/or
- the first and second seals each comprise: 1) an annular main body and a lip flange extending outwardly from the main body; and 2) a pocket defined between the main body and the lip flange, and open to the first side; wherein the lip flange defines an outer periphery of the corresponding seal and is biased against the flywheel shaft; and wherein the first and second seals are configured such that applying a greater pressure to the first side than the second side causes the lip flange to be urged outward; and/or
- the first and second seals further comprise an O-ring disposed between the main body and the corresponding heat transfer shaft assembly; and/or
- a ratio of sealing in the secondary sealing direction to sealing in the primary sealing direction is about 1:3 or less; and/or
- the flywheel shaft has a longitudinal passage connecting the first cavity and the second cavity; and/or
- a liquid heat transfer medium is disposed in the first cavity, the second cavity, and the longitudinal passage; and/or
- there is only one longitudinal passage through the flywheel shaft from the first cavity to the second cavity; and/or
- the first end is disposed above the second end; and/or the flywheel and the flywheel shaft are integrally formed with one another; and/or the first uneven seal is mounted on the first heat transfer shaft assembly, and the second uneven seal is mounted on the second heat transfer shaft assembly; or the first uneven seal is mounted on the flywheel shaft, and the second uneven seal is mounted on the flywheel shaft.

In another aspect, the disclosure is directed to a method of assembling a gyroscopic roll stabilizer for a boat. The gyroscopic roll stabilizer includes an enclosure and a flywheel assembly supported in the enclosure for rotation about a flywheel axis. The flywheel assembly includes a flywheel shaft and a flywheel. The flywheel shaft has a first end and an opposite second end. The method includes installing a first uneven seal between the flywheel shaft and a first heat transfer shaft assembly that is fixed relative to the enclosure and extends into an open-ended first cavity formed in the first end of the flywheel shaft, so that the first seal extends between the first heat transfer shaft assembly and the flywheel shaft to enclose the first cavity. The method also includes installing a second uneven seal between the flywheel shaft and a second heat transfer shaft assembly that is fixed relative to the enclosure and extends into an open-ended second cavity formed in the second end of the flywheel shaft, so that the second seal extends between the second heat transfer shaft assembly and the flywheel shaft to enclose the second cavity. The first and second cavities face away from each other. The first and second uneven seals each have a respective first side and an opposite second side; wherein the first and second seals are both configured to provide asymmetric sealing such that greater resistance is provided against flow in a primary sealing direction, from the first side toward the second side, than in a secondary sealing direction, from the second side toward the first side. The first side of the second seal faces inward toward the second cavity, and the second side of the first seal faces inward toward the first cavity. In some aspects, the method is such that:

the installing the first seal occurs after the installing the second seal; and/or the flywheel shaft has a longitudinal passage connecting the first cavity and the second cavity; and the method further comprises, after installing the second seal and prior to the installing the first seal, inspecting the second cavity and/or the second seal via the longitudinal passage; wherein the longitudinal passage is accessed via the first cavity for the inspecting; and/or the method further comprises, after the inspecting and prior to the installing the first seal, filling the second cavity with a liquid heat transfer medium via the longitudinal passage by adding the liquid heat transfer medium to the longitudinal passage and/or the first cavity; and/or the method further comprises adjusting or replacing the second seal based on the inspecting; and/or wherein the first and second seals each comprise: 1) an annular main body and a lip flange extending outwardly from the main body; and 2) a pocket defined between the main body and the lip flange, and open to the first side; and wherein the filling comprises filling the pocket of the second seal with the liquid heat transfer medium; and/or the method further comprises, after the installing the first seal and the installing the second seal, closing the enclosure; and/or the first end is disposed below the second end during the installing the second seal; and the first end is disposed above the second end during the installing the first seal; and/or the first uneven seal is mounted on the first heat transfer shaft assembly, and the second uneven seal is mounted on the second heat transfer shaft assembly; or the first uneven seal is mounted on the flywheel shaft, and the second uneven seal is mounted on the flywheel shaft.

In yet another aspect, the present disclosure is directed to a method of maintaining a gyroscopic roll stabilizer for a boat. The gyroscopic roll stabilizer includes an enclosure and a flywheel assembly supported in the enclosure for rotation about a flywheel axis. The flywheel assembly includes a flywheel shaft and a flywheel. The flywheel shaft has a first end and an opposite second end. The method includes installing a first uneven seal between the flywheel shaft and a first heat transfer shaft that is fixed relative to the enclosure and extends into an open-ended first cavity formed in the first end of the flywheel shaft, so that the first seal extends between the first heat transfer shaft assembly and the flywheel shaft to enclose the first cavity. Prior to the installing, a second uneven seal is installed between the flywheel shaft and a second heat transfer shaft that is fixed relative to the enclosure and extends into an open-ended second cavity formed in the second end of the flywheel shaft, so that the second seal extends between the second heat transfer shaft assembly and the flywheel shaft to enclose the second cavity. The first and second cavities face away from each other. The first and second uneven seals each have a respective first side and an opposite second side. The first and second seals are both configured to provide asymmetric sealing such that greater resistance is provided against flow in a primary sealing direction, from the first side toward the second side, than in a secondary sealing direction, from the second side toward the first side. The first side of the second seal faces inward toward the second cavity, and the second side of the first seal faces inward toward the first cavity. In some aspects, the method is such that:

the first end is advantageously disposed above the second end during the installing the first seal; and/or the flywheel shaft has a longitudinal passage connecting the first cavity and the second cavity; further comprising, prior to the installing the first seal, inspecting the second cavity and/or the second seal via the longitudinal passage; wherein the longitudinal passage is accessed via the first cavity for the inspecting; and/or the method further comprises, after the inspecting and prior to the installing the first seal, filling the second cavity with a liquid heat transfer medium via the longitudinal passage by adding the liquid heat transfer medium to the longitudinal passage and/or the first cavity; and/or the first and second seals each comprise: 1) an annular main body and a lip flange extending outwardly from the main body; and 2) a pocket defined between the main body and the lip flange, and open to the first side; and wherein the filling comprises filling the pocket of the second seal with the liquid heat transfer medium; and/or the method further comprises, after the installing the first seal, closing the enclosure; and/or the installing the first seal comprises inserting the first heat transfer shaft trough a central opening of the first seal; and/or the method further comprises, prior to the installing the first seal, installing the second uneven seal on the second heat transfer shaft so that the second seal extends between the second heat transfer shaft assembly and the flywheel shaft to enclose the second cavity; and/or the first uneven seal is mounted on the first heat transfer shaft assembly, and the second uneven seal is mounted on the second heat transfer shaft assembly; or the first uneven seal is mounted on the flywheel shaft, and the second uneven seal is mounted on the flywheel shaft.

In still another aspect, the present disclosure is directed to a method of operating a gyroscopic roll stabilizer for a boat. The gyroscopic roll stabilizer includes an enclosure and a flywheel assembly supported in the enclosure for rotation about a flywheel axis. The flywheel assembly includes a flywheel shaft and a flywheel. The flywheel shaft has a first end and an opposite second end. The method includes generating heat by spinning the flywheel assembly about the flywheel axis while rotating the enclosure, and while maintaining a below ambient pressure in the enclosure. The method also includes heating, using the generated heat, a liquid heat transfer medium disposed in an open-ended first cavity formed in the first end of the flywheel shaft. The method also includes, in response to the heating, evolving dissolved gas from the liquid heat transfer medium. The method also includes venting at least a portion of the evolved gas past a first uneven seal that extends between a first heat transfer shaft assembly and the flywheel shaft to enclose the first cavity; the first heat transfer shaft assembly fixed relative to the enclosure and extending into the first cavity. During the venting, a second uneven seal remains between the flywheel shaft and a second heat transfer shaft assembly that is fixed relative to the enclosure and extends into an open-ended second cavity formed in the second end of the flywheel shaft and facing away from the first end, so that the second seal extends between the second heat transfer shaft assembly and the flywheel shaft to enclose the second cavity. The first and second uneven seals each have a respective first side and an opposite second side. The first and second seals are both configured to provide asymmetric sealing such that greater resistance is provided against flow in a primary sealing direction, from the first side toward the second side, than in a secondary sealing direction, from the second side toward the first side. The first side of the second seal faces inward toward the second cavity, and the second side of the first seal faces inward toward the first cavity. In some aspects, the method is such that:

the flywheel shaft has a longitudinal passage connecting the first cavity and the second cavity, and the liquid heat transfer medium is disposed in the longitudinal passage and the second cavity; and/or the first and second seals each comprise: an annular main body and a lip flange extending outwardly from the main body; and a pocket defined between the main body and the lip flange, and open to the first side; and wherein the liquid heat transfer medium fills the pocket of the second seal; and/or the first and second seals further comprise an O-ring disposed between the main body and the corresponding heat transfer shaft assembly; and/or the first seal is configured to maintain a seal against a pressure differential in the secondary sealing direction of about 5 psi; and/or a ratio of sealing in the secondary sealing direction to sealing in the primary sealing direction is about 1:3 or less; and/or the first uneven seal is mounted on the first heat transfer shaft assembly, and the second uneven seal is mounted on the second heat transfer shaft assembly; or the first uneven seal is mounted on the flywheel shaft, and the second uneven seal is mounted on the flywheel shaft.

In another aspect, the present disclosure is directed to a method of operating a gyroscopic roll stabilizer for a boat. The gyroscopic roll stabilizer includes an enclosure and a flywheel assembly supported in the enclosure for rotation about a flywheel axis. The flywheel assembly includes a flywheel shaft and a flywheel. The flywheel shaft has a first end and an opposite second end, an open-ended first cavity formed in the first end of the flywheel shaft, and an open-ended second cavity formed in the second end of the flywheel shaft and facing away from the first end. The method includes controlling a pressure differential between the first and second cavities in the flywheel assembly and ambient pressure inside the enclosure across first and second uneven seals, which seal the first and second cavities respectively in the flywheel assembly, by: 1) automatically venting, in response to the pressure differential being above a first threshold with pressure being higher in the first cavity, fluid from the first cavity past the first uneven seal, while maintaining seal of the second cavity with the second uneven seal; and/or 2) automatically introducing, in response to the pressure differential being above a second threshold with pressure being lower in the second cavity, fluid into the second cavity past the second uneven seal, while maintaining seal of the first cavity with the first uneven seal. The flywheel shaft has a longitudinal passage connecting the first cavity and the second cavity. The first and second uneven seals each have a respective first side and an opposite second side. The first and second seals are both configured to provide asymmetric sealing such that greater resistance is provided against flow in a primary sealing direction, from the first side toward the second side, than in a secondary sealing direction, from the second side toward the first side. The first side of the second seal faces inward toward the second cavity, and the second side of the first seal faces inward toward the first cavity. In some aspects, the method is such that:

the first and second thresholds are different; and/or the first threshold is about 5 psi; and/or liquid heat transfer medium fills the second cavity and abuts the second seal; wherein the liquid heat transfer medium fills the longitudinal passage and at least part of the first cavity; and/or the fluid vented past the first seal is a gas; and/or the first uneven seal is mounted on the first heat transfer shaft assembly, and the second uneven seal is mounted on the second heat transfer shaft assembly; or the first uneven seal is mounted on the flywheel shaft, and the second uneven seal is mounted on the flywheel shaft.

The features, functions and advantages that have been discussed above, and/or are discussed below, can be achieved independently in various aspects or may be combined in yet other aspects, further details of which can be seen with reference to the following description and the drawings.

DETAILED DESCRIPTION

Figure 1A:
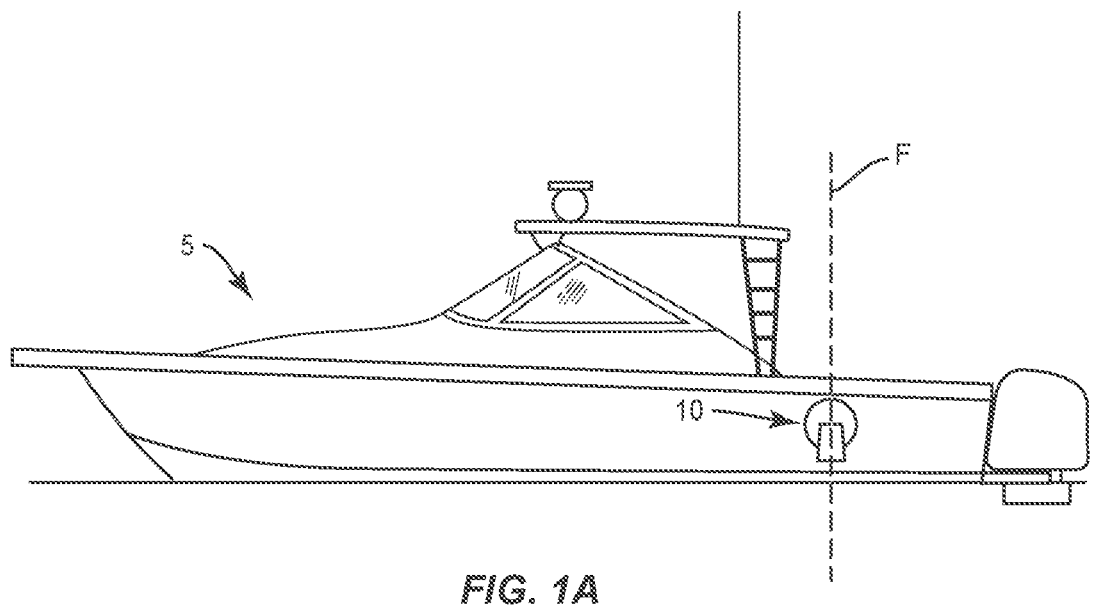
FIGS. 1A and 1B illustrate a boat equipped with a CMG as herein described.
Figure 1B:
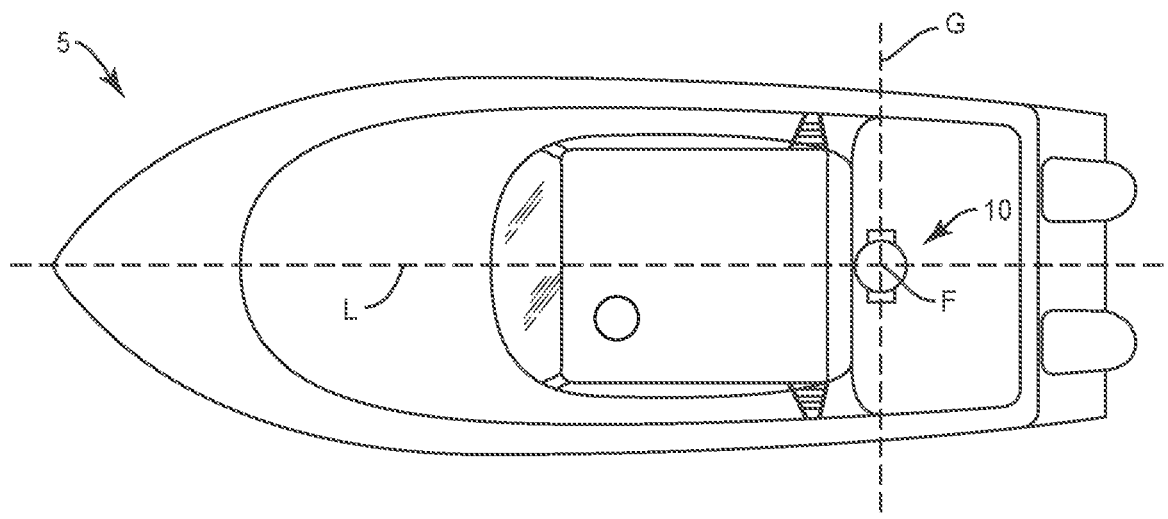

Referring now to the drawings, FIGS. 1A and 1B illustrate a control moment gyroscope (CMG) 10 mounted in a boat 5 for roll stabilization. Multiple embodiments of the CMG 10 are described. For convenience, similar reference numbers are used in the following description of the embodiments to indicate similar elements in each of the embodiments.

Figure 2:
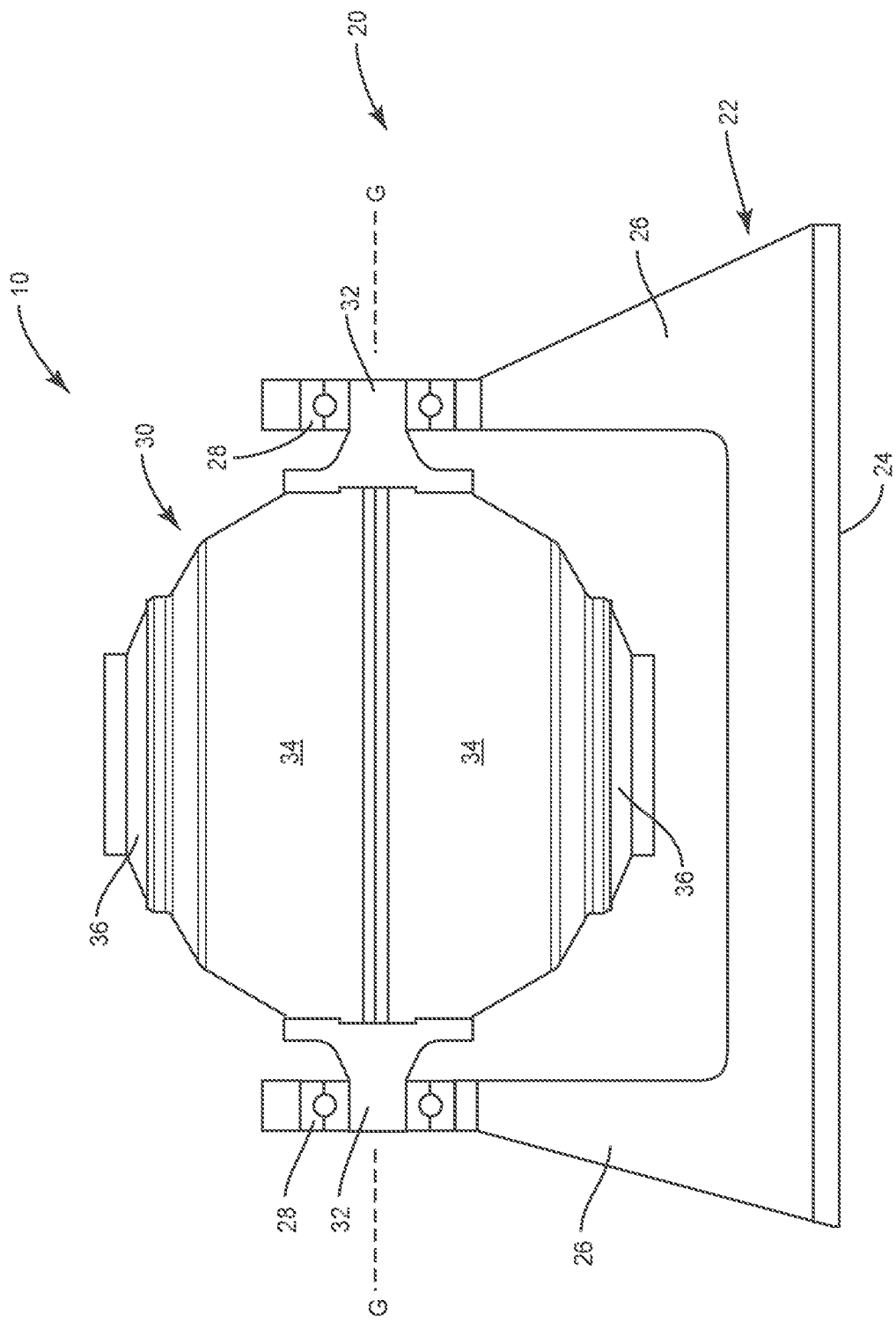
FIG. 2 show an elevation view of a CMG configured as a boat roll stabilizer according to an embodiment.
Figure 3:
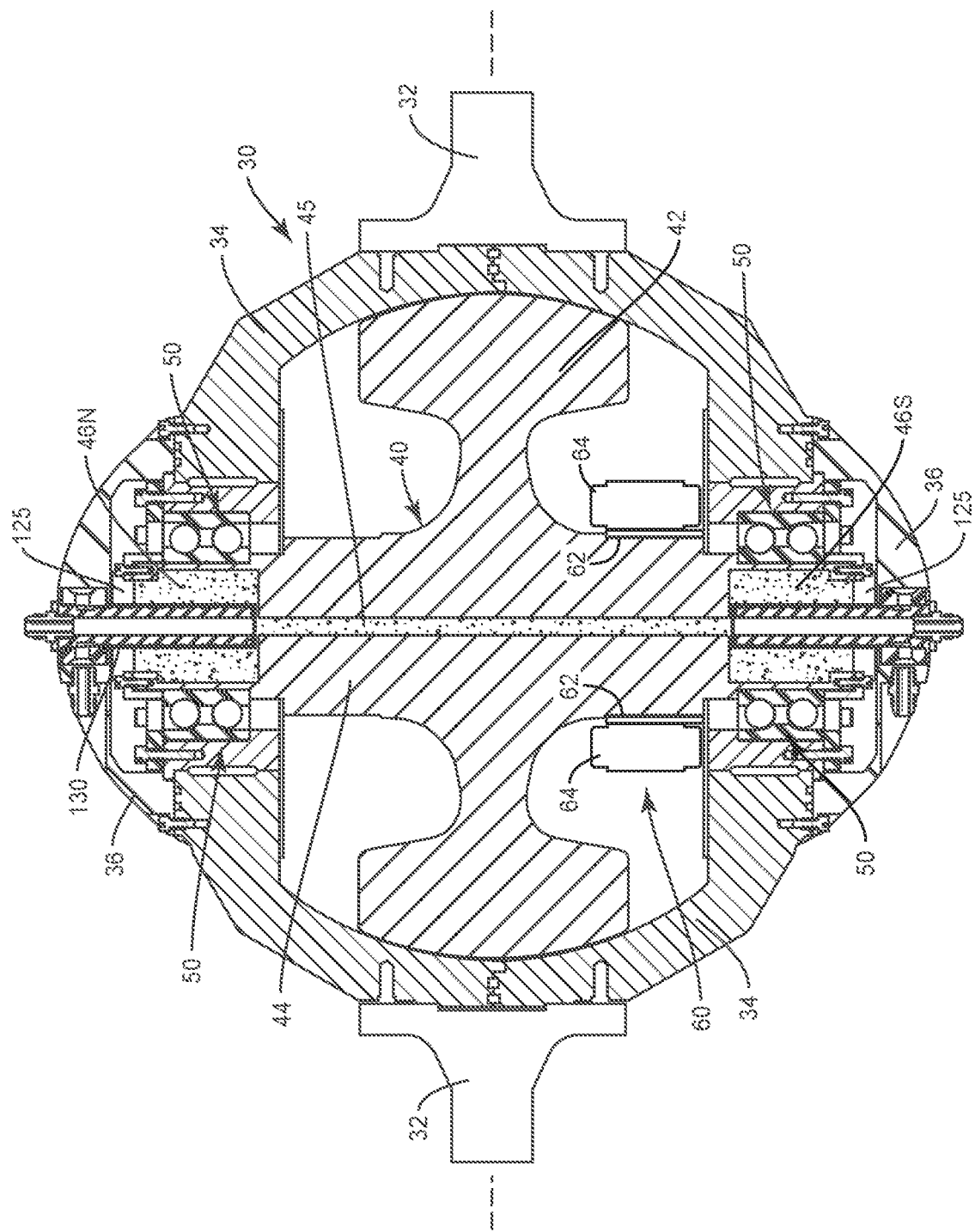
FIG. 3 shows a section view through the enclosure of a CMG according to an embodiment.

Referring now to FIGS. 2 and 3, the main functional elements of the CMG 10 comprise a single-axis gimbal 20, an enclosure 30 mounted to the gimbal 20 for rotation about a gimbal axis G, a flywheel assembly 40 mounted by bearings 50 inside the enclosure, a motor 60 to rotate the flywheel assembly 40, and a torque control system 70 (FIG. 4) to control precession of the flywheel assembly 40 so that the energy of the flywheel assembly 40 is transferred to the hull of the boat 5 to counteract rolling motions. Each of the embodiments further comprises a bearing cooling system 100 to cool the flywheel bearings 50. Various designs of the bearing cooling system 100 are shown in the figures.

The gimbal 20 comprises a support frame 22 that is configured to be securely mounted in the boat 5. Preferably, the gimbal 20 is mounted along a longitudinal axis L of the boat 5 with the gimbal axis G extending transverse to the longitudinal axis L. Conventionally, the gimbal 20 is mounted in the hull of the boat 5, but could be mounted at any location. The support frame 22 of the gimbal 20 comprises a base 24 and two spaced-apart supports 26. A bearing 28 is mounted on each support 26 for rotatably mounting the enclosure 30 to the supports 26. For this purpose, the enclosure 30 includes two gimbal shafts 32 projecting from diametrically opposed sides of the enclosure 30. The gimbal shafts 32 are rotatably journaled in the gimbal bearings 28 to allow the enclosure 30 and flywheel assembly 40 to rotate or precess about the gimbal axis G in the fore and aft directions.

The basic elements of enclosure 30 are the same in the various embodiments described herein but vary in some details depending on the design of the bearing cooling system 100. The enclosure 30 is generally spherical in form and comprises two main housing sections 34 and two cover plates 36. The two main housing sections 34 join along a plane that typically bisects the spherical enclosure 30. The cover plates 36 join the main housing sections 34 along respective planes closer to the "poles" of the spherical enclosure 30. All joints in the enclosure 30 are sealed to maintain a below-ambient pressure within the enclosure 30 to reduce aerodynamic drag on the flywheel assembly 40. Typical below-ambient pressures should be in the range of 1-40 torr (133-5333 Pa, 0.02-0.77 psi). Although the construction of the enclosure 30 is generally the same in the embodiments herein described, the details of the housing sections 34 and cover plates 36 vary as described more fully below depending on the design of the bearing cooling system used.

Referring to FIG. 3, the flywheel assembly 40 comprises a flywheel 42 and flywheel shaft 44 that is mounted for rotation inside the enclosure 30 of the gimbal 20 so that the axis of rotation F of the flywheel assembly 40 is perpendicular to the gimbal axis G. Thus, when the boat 5 is level such that gimbal axis G is horizontal, the axis of rotation F of the flywheel shaft 44 will be in the vertical direction, typically perpendicular to the deck of the boat. The flywheel 42 and shaft 44 may be formed as a unitary piece, or may comprise two separate components. In one exemplary embodiment, the diameter and the flywheel 42 is approximately 20.5 inches and the flywheel assembly 40 has a total weight of about 614 lbs. The flywheel assembly 40 has a moment of inertia of about 32,273 lbm in$^2$. When rotated at a rate of 9000 rpm, the angular momentum of the flywheel assembly 40 is about 211,225 lbm ft$^2$/s.

The flywheel assembly 40 is supported by upper and lower bearing assemblies inside the enclosure 30. Each bearing assembly comprises a bearing 50 mounted within a bearing block 58. Each bearing 50 comprises an inner race 52 that is affixed to and rotates with the flywheel shaft 44, an outer race 54 that is mounted inside the bearing block 58, and one or more ball bearings 56 disposed between the inner and outer races 52, 54. The bearing blocks 58 are secured to the interior of the enclosure 30. The outer race 54 is mounted to bearing block 58, and bearing block 58 is mounted to the enclosure 30, so that the outer race 54 is rotationally fixed relative to the enclosure 30. The mounting of the bearing block 58 to the enclosure 30 may be via any suitable means, such as by suitable lip(s) in the bearing block 58 and one or more bearing cap plates 59$a$ held by screws. Likewise, the affixing of the inner race 52 to the flywheel shaft 44 may be by any suitable means, such as press fitting, and/or suitable lip(s) in the flywheel shaft 44 and one or more bearing cap plates 59$b$ held by screws. The bearing block 58 may be generally round in cross-section (perpendicular to flywheel axis F), but this is not required and any suitable shape may be employed, including faceted shapes. Seals (not shown) are disposed on the top and bottom of the bearings 50 to contain lubricant in the bearings 50.

The motor 60 rotates the flywheel assembly 40 at a high rate of speed (e.g., 9000 rpm). The motor 60 typically includes a rotor 62 that mounted to the flywheel shaft 44 and a stator 64 that this secured to the enclosure 30 by any suitable mounting system. Although the motor 60 is advantageously mounted inside the enclosure 30, it is also possible to mount the motor 60 on the exterior of the enclosure 30. In one embodiment, the motor 60 operates on 230 Volt single phase AC power (or could be three-phase AC power, or AC or DC battery power, such as from a lithium ion battery pack).

Figure 4:
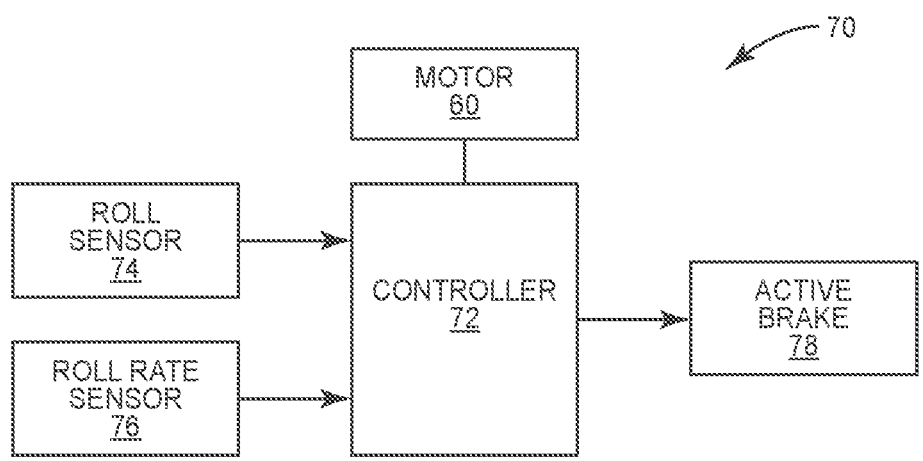
FIG. 4 shows a torque control system for the CMG.

The torque control system 70, shown in FIG. 4, controls the rate of precession of the flywheel assembly 40 about the gimbal axis G. The rolling motion of a boat 5 caused by wave action can be characterized by a roll angle and roll rate. The rolling motion causes the flywheel 42 to precess about the gimbal axis G. Sensors 74, 76 measure the roll angle and roll rate respectively, which are fed to a controller 72. The controller 72 generates control signals to control an active braking system or other torque applying device 78 that controls the rate of precession of the flywheel assembly 40. By controlling the rate of precession, the flywheel assembly 40 generates a torque in opposition to the rolling motion. This torque is transferred through the gimbal 20 to the boat 5 to dampen the roll of the boat 5. An example of the active braking system 78 is described in U.S. Patent Application Publication 2020/0317308, entitled "Braking System For Gyroscopic Boat Roll Stabilizer", the disclosure of which is incorporated herein by reference in its entirety.

When the flywheel assembly 40 rotates at high speed, the bearings 50 and motor 60 will generate a substantial amount of heat, particularly when the flywheel assembly 40 is precessing, which could lead to bearing and/or motor failure. Cooling the bearings is challenging, particularly when the interior of the enclosure 30 is a significantly below ambient pressure environment. Bearing cooling system 100 allows cooling of bearings 50 and other heat generating components contained within the enclosure without direct contact of the recirculated oil or liquid coolant with the bearings 50, which may result in high frictional losses. In general, heat is transferred by solid and/or liquid conduction to a heat sink that is cooled by oil, glycol, or other liquid coolant flowing along the cooling circuit 100.

Note that the flywheel shaft 44 has a first end and an opposite second end. For ease of reference, these may be referred to as the north end 47N and the south end 47S, it being understood that such labels are merely for convenience, and the orientations may be reversed as desired. The north end 47N of the flywheel shaft 44 includes an open-ended cavity 46N, which faces away from the flywheel 42. Likewise, the south end 47S of the flywheel shaft 44 includes an open-ended cavity 46S, which faces away from the flywheel 42. These cavities 46N, 46S are involved with cooling the bearings 50, and may generically be referred to as cavity 46. Note that the cavities 46 are open-end in that they are open-ended with respect to the rest of the flywheel shaft 44, even if the cavities 46 are closed off by other components, such as seal 125 and/or cover plates 36. In the discussion below, cooling of bearings 50 associated with the north end 47N will be discussed; it being understood that cooling of bearings 50 associated with the south end 47S is advantageously performed similarly, and discussion of the cooling of the bearings 50 associated with the south end 47S is generally omitted for clarity.

Bearing cooling circuit 100 is configured to transfer heat away from the inner race 52 of the bearing 50 by recirculating cooling fluid 90. See FIG. 7. The cooling fluid 90 in bearing cooling circuit 100 may be any suitable fluid, with a liquid such as glycol and/or glycol mixtures being particular examples.

Figure 5:
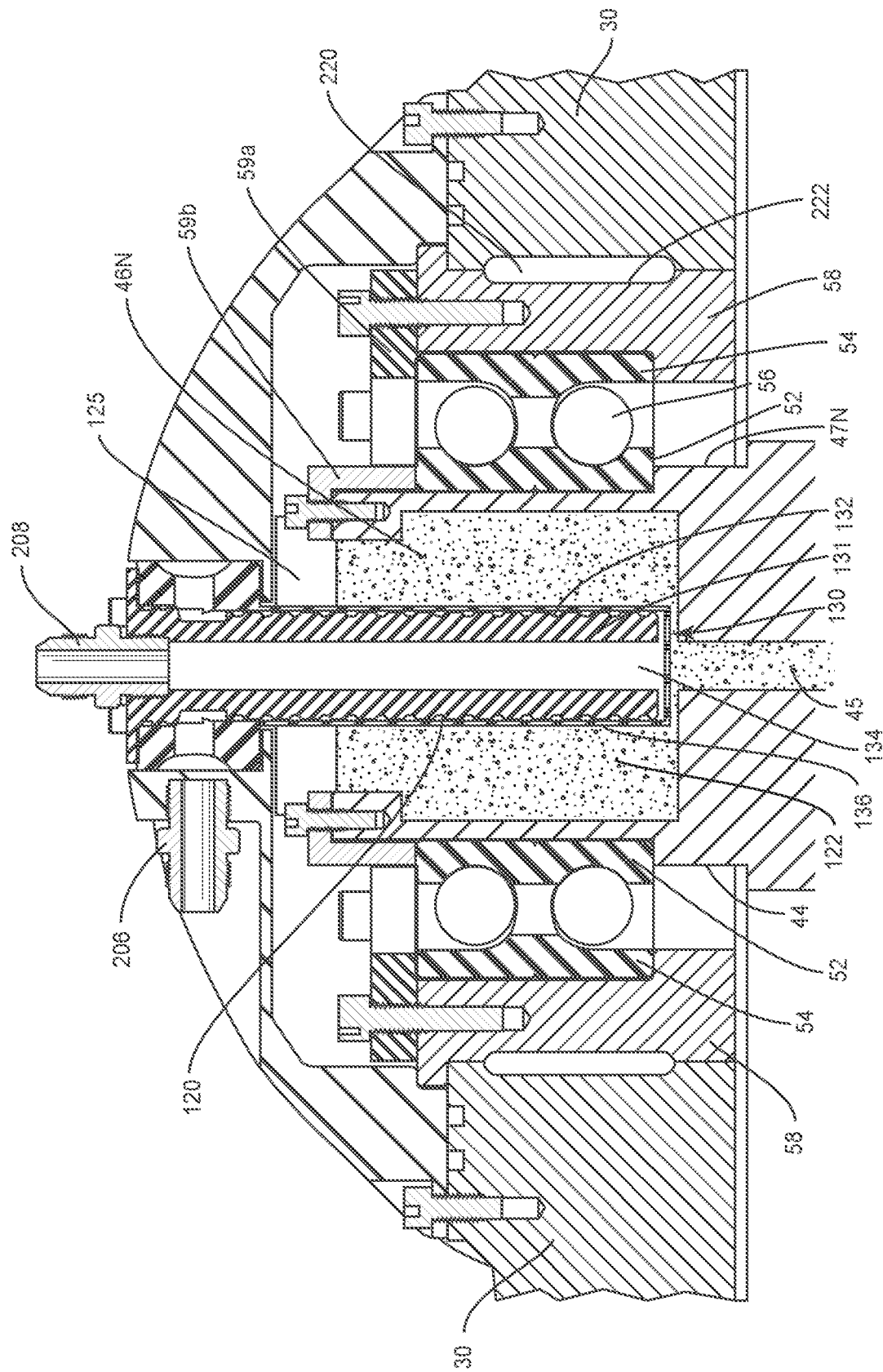
FIG. 5 shows a partial section view illustrating portions of the bearing cooling system according to an embodiment.

FIG. 5 illustrates a bearing cooling circuit 100 for a gyroscopic boat stabilizer (e.g., CMG 10) for cooling the inner race 52 of bearing 50. As mentioned above, the flywheel shaft 44 includes open-ended cavity 46 formed in each end of the flywheel shaft 44. A liquid heat transfer medium 122 is disposed in cavity 46. The liquid heat transfer medium 122 may be any suitable material for operating in the low-pressure environment of the enclosure 30. For example, the liquid heat transfer medium 122 may be hydrocarbon oils (alkylated aromatics as well as alkanes, paraffinic mineral oils, and other synthetic hydrocarbons), fluorocarbon oils (such as PFPE), silicone fluids of various chain lengths (e.g., polydimethylsiloxane (PDMS)), glycol mixtures, and combinations thereof. The liquid heat transfer medium 122 is held in cavity 46 by one or more suitable seals 125. Note that the inner race 52 is affixed to the flywheel shaft 44 proximate cavity 46.

As shown in FIG. 5, bearing cooling circuit 100 includes a heat transfer shaft assembly 130 rotationally fixed relative to the flywheel axis F and extending from the enclosure 30 into cavity 46 so as to contact liquid heat transfer medium 122. The bearing cooling circuit 100 also includes a closed fluid pathway 210 for the cooling fluid 90 that extends through the heat transfer shaft assembly 130 to internally cool the heat transfer shaft assembly 130. The CMG 10 is configured to transfer heat away from the inner race 52 to the flywheel shaft 44, and from the flywheel shaft 44 to the liquid heat transfer medium 122, and from the liquid heat transfer medium 122 to the heat transfer shaft assembly 130, and from the heat transfer shaft assembly 130 to the cooling fluid 90. Note that the cavity 46 is wider (in the horizontal direction of FIG. 5) than the corresponding section of the heat transfer shaft assembly 130. Thus, the heat transfer assembly 130 and the inner wall of the cavity 46, assuming both are round in cross-section, are annularly spaced from one another by a gap, and the liquid heat transfer medium 122 is disposed in this gap. Optimal sizing of this gap may depend on the viscosity, heat transfer, and other characteristics of the liquid heat transfer medium 122, which impact the viscous drag and/or corresponding heat generation of the liquid heat transfer medium 122. In some aspects, this gap advantageously in the range of about one half to one and a half inches.

In some aspects, the heat transfer shaft assembly 130 is a simple unified shaft that includes an internal chamber for the cooling fluid to be circulated through. In other aspects, the heat transfer shaft assembly 130 includes a shaft 131, a sleeve 136, and fluid channel 120. The shaft 131 extends from the enclosure 30 and into cavity 46. The shaft 131 advantageously has outer groove(s) 132 and an inner passage 134. Groove(s) 132 may be oriented perpendicular to the flywheel axis F, or may advantageously spiral around the flywheel axis F, such as by being helical or other spiral shape. Alternatively, groove(s) 132 may wind around the shaft 131 in any suitable fashion, such as in a sinusoidal shape, or a zig-zag shape, whether regular or irregular. Advantageously, the fluid pathway 210 peripherally surrounds the flywheel axis F, such as by circumnavigating the shaft 131. The sleeve 136 is disposed about the shaft 131 in spaced relation to the "floor" of the groove(s) 132 and in spaced relation to an inner wall on flywheel shaft 44 defining the cavity 46. A fluid channel 120 is jointly defined by the sleeve 136 and the groove(s) 132, with the fluid channel 120 having the cooling fluid therein. A closed fluid pathway 210 for recirculating cooling fluid 90 extends through fluid channel 120. Note that in alternative embodiments, the groove(s) 132 are alternatively and/or additionally formed on the sleeve 136. Thus, it should be considered that the fluid channel 120 is jointly formed by the shaft 131 and sleeve 136, regardless of whether the groove(s) 132 are in the shaft 131, or the sleeve 136, or both.

Cooling fluid 90 flows through the bearing cooling circuit 100, including the fluid channel 120. When shaft 131 with inner passage 134 is present, the inner passage 134 may be downstream relative to the fluid channel 120 along the fluid pathway 210, so that cooling fluid 90 flows through the fluid channel 120, and then out of the heat transfer shaft assembly 130 via the inner passage 134. In other aspects, the flow is reversed so that cooling fluid 90 flows through the inner passage 134, and then out of the heat transfer shaft assembly 130 via the fluid channel 120.

Figure 7:
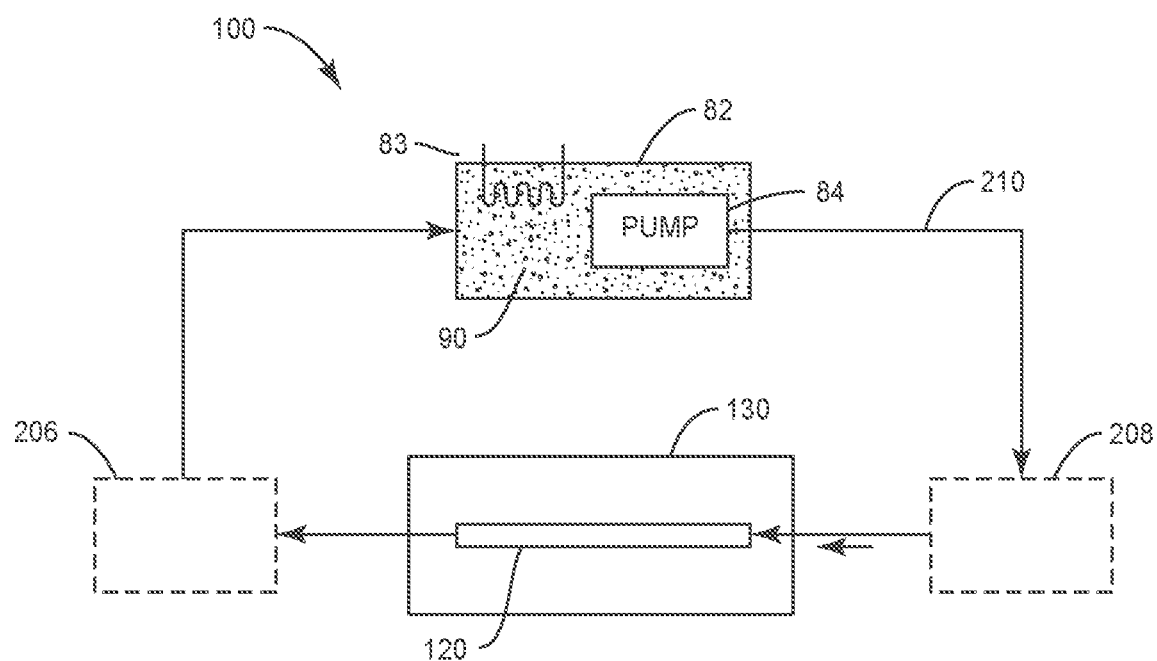
FIG. 7 shows a simplified schematic of a bearing cooling circuit for cooling the inner race.

As shown schematically in FIG. 7, bearing cooling circuit 100 includes a reservoir 82 for the cooling fluid 90 flowing through the "closed" circuit of cooling circuit 100, and a fluid pump 84 operative to recirculate the cooling fluid 90 through bearing cooling circuit 100, and a heat exchanger 83. The pump 84 is operatively connected to the fluid channel 120 and configured to recirculate the cooling fluid 90 through the fluid channel 120 to remove heat from the inner race 52 via the flywheel shaft 44, the liquid heat transfer medium 122, and heat transfer shaft assembly 130. The heat exchanger 83 is operatively connected to the closed fluid pathway 210 and configured to remove heat from the cooling fluid 90 to ambient after the cooling fluid 90 has passed through fluid channel 120. In some embodiments, a scavenging means is provided to collect liquid coolant that may seep into the interior of the enclosure 30 and return the liquid coolant to the fluid reservoir 82. Also, in some aspects, the fluid pathway 210 also includes an inlet port 206 and an outlet port 208. The inlet port 206 is operatively disposed between the pump 84 and the fluid channel 120, and operative to allow passage of the cooling fluid 90 into the enclosure 30 toward the fluid channel 120. The outlet port 208 is operatively disposed between the fluid channel 120 and the heat exchanger 83, and operative to allow passage of the cooling fluid 90 out of the enclosure 30 toward the heat exchanger 83.

For the FIG. 5 arrangement, the heat flow for dissipating heat from the inner race 52 is from the inner race 52, to the flywheel shaft 44, then to the liquid heat transfer medium 122, then to the heat transfer shaft assembly 130, then to the cooling fluid 90, typically then to external to the CMG 10 via the heat exchanger 83.

Figure 6:
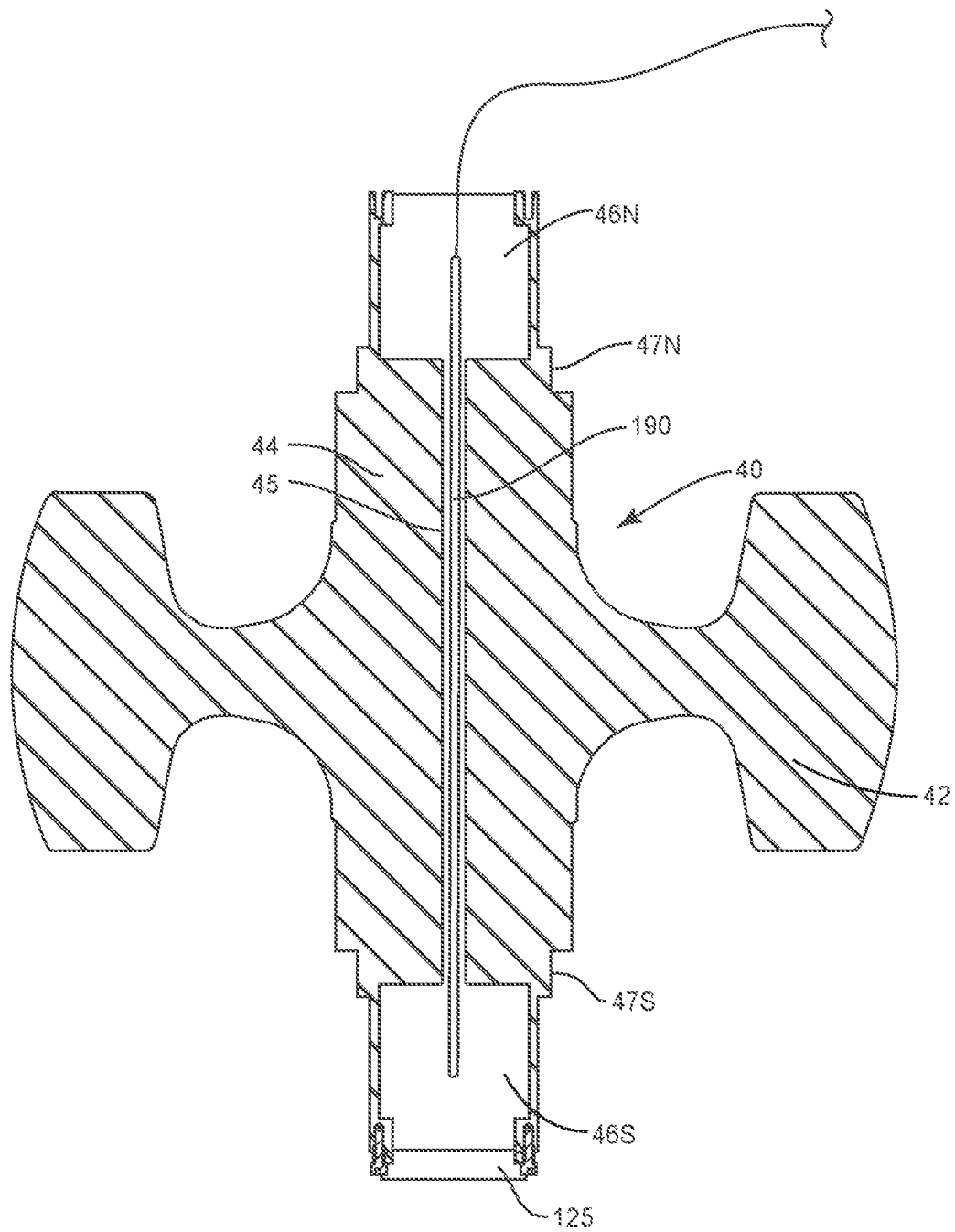
FIG. 6 shows a section view of a flywheel assembly with a longitudinal passage through the flywheel shaft, an associated seal, and an inspection tool.

As can be appreciated, keeping liquid heat transfer medium 122 in cavity 46 allows proper cooling of bearing 50. As such, seals, such as seal 125 in FIG. 5, are disposed to keep the liquid heat transfer medium 122 in cavity 46. However, verifying the condition of cavity 46 and/or a good seal prior to operation may help improve performance. To this end, the flywheel shaft 44 includes a longitudinal passage 45 that operatively interconnects the upper and lower cavities 46. Referring to FIGS. 5-6, the flywheel shaft 44 has two ends 47, which may be referred to as the north end 47N, and the opposing south end 47S. The north end 47N includes the north cavity 46N, while the south end 47S includes the south cavity 46S. The ends 47N, 47S may be generically referred to as end 47, while the cavities 46N, 46S may be generically referred to as cavity 46. Longitudinal passage 45 connects the cavities 46N, 46S. Longitudinal passage 45 may be formed during forging of the flywheel shaft 44, by gun drilling the flywheel shaft 44, or by other means. The longitudinal passage 45 opens into each cavity 46, and allows for the liquid heat transfer medium 122 in the two cavities 46 to be in fluid communication. In addition, the longitudinal passage 45 allows for one cavity (e.g., 46S) to be inspected and/or filled from the opposing end (e.g., north end 47N) of the flywheel shaft 44. Thus, the south cavity 46S may be inspected and/or (wholly or partly) filled with liquid heat transfer medium 122 from the north end 47N of flywheel shaft 44, and/or the north cavity 46N may be inspected and/or (wholly or partly) filled with liquid heat transfer medium 122 from the south end 47S of flywheel shaft 44.

Figure 8:
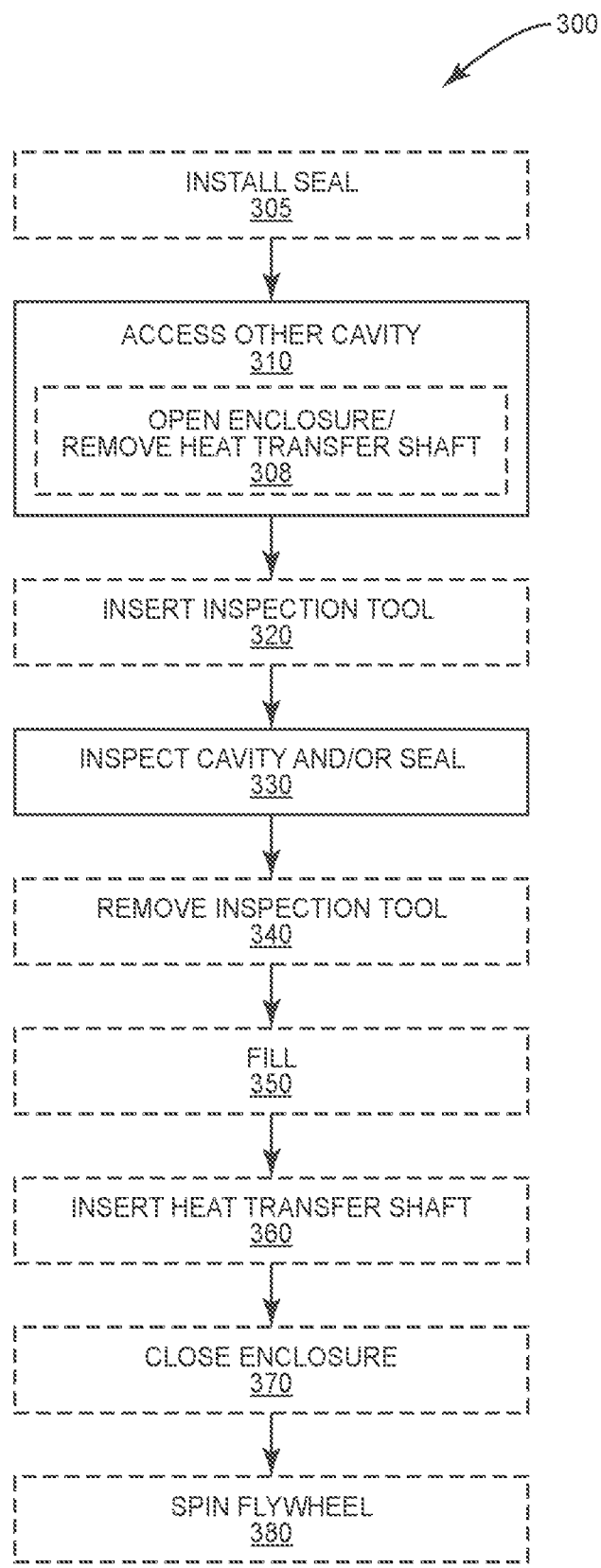
FIG. 8 shows a simplified flowchart of an exemplary method for assembling or maintaining a gyroscopic roll stabilizer.

An exemplary process (300) of assembling or maintaining the gyroscopic roll stabilizer 10 is shown in FIG. 8. The process optionally starts with installing (305) the seal 125 associated with the second cavity 46, which is the south cavity 46S in this example. Note that if the gyroscopic roll stabilizer 10 is already assembled, step 305 is typically not necessary unless that seal 125 is known to be in need of replacement. The process includes accessing (310) the other cavity 46, which is the north cavity 46N in this example. The accessing (310) may include opening (308) the enclosure 30 and removing the heat transfer shaft assembly 130 from the north cavity 46N. Note that step 308 is useful for maintaining (preventive maintenance or service maintenance) the CMG 10, but is likely not required for initial assembly of the CMG 10 unless some sort of initial assembly rework is required. The liquid heat transfer medium 122, if present, is then optionally removed from the CMG 10 via any suitable method. The process includes inspecting (330) the south cavity 46S and/or the seal 125 associated with the south cavity 46S via the longitudinal passage 45. The inspection may be by pressure test, a leak down test, and/or via an inserted inspection tool 190, such as a bore scope. When using an inserted inspection tool 190, the process optionally includes inserting (320) the inspection tool 190 into the longitudinal passage 45 in a direction toward the south end 47S, and advantageously into the south cavity 46S. Note that some inspections may not require an inspection tool 190 to be inserted into the longitudinal passage 45, such as a gas pressure test where the gas pressure is applied in north cavity 46N with suitable sealing, such that longitudinal passage 45 allows that pressure to be communicated between the cavities 46. If used, the inspection tool 190 is advantageously then removed (340) once the inspection is complete. Note that the seal 125 associated with the south cavity 46S may be adjusted or replaced based on the inspection, during or after the inspecting (330). The exemplary process continues with filling (350) the second cavity (e.g., south cavity 46S), the longitudinal passage 45, and at least part of the first cavity (e.g., north cavity 46N) with a liquid heat transfer medium 122. The process optionally includes thereafter inserting (360) the heat transfer shaft assembly 130 back into the first cavity (e.g., north cavity 47N). Further, the process optionally includes closing (370) the enclosure 30 and/or thereafter spinning (380) the flywheel 42.

The exemplary process (300) discussion above has been in the context of the south cavity 46S and/or the seal associated with the south cavity 46S being inspected via the longitudinal passage 45. Such an approach may be particularly useful when assembling the gyroscopic roll stabilizer 10, starting with assembly of the southern portions. With the enclosure 30 inverted, such that the south cavity 46S is disposed above the north cavity 46N, the southern heat transfer shaft assembly 130 may be inserted into the south cavity 46S, the associated seal 125 installed (305), and the south cover plate 36 installed. At this point, the south cavity 46S does not have liquid heat transfer medium 122 therein. The enclosure 30 is then "righted" so that the north cavity 46N and the north end 47N of the flywheel shaft 44 is disposed above the south cavity 46S and the south end 47S of the flywheel shaft 44. The process of inspecting (330) the south cavity 46S and/or seal 125, and filling (350), is then carried out. The north cavity 46N is then fully filled with liquid heat transfer medium 122 as appropriate, and the north seal 125 installed. The north cover plate 36 is then installed. The CMG 10 is then optionally tested, such as by spinning (380) the flywheel, as appropriate.

The presence of the longitudinal passage 45 connecting the cavities 46 provides benefits which may be present all together, or separately, depending on the particular embodiment of the gyroscopic roll stabilizer. First, the longitudinal passage 45 allows the south cavity 46S and/or seal 125 to be inspected both after the southern portion is closed up with the seal 125 in place, and from the opposing (north) end 47N of the enclosure 30. Second, the longitudinal passage 45 allows liquid heat transfer medium 122 to be added to south cavity 46S both after the southern portion is closed up with the seal 125 in place, and from the opposing (north) end 47N of the enclosure. The liquid heat transfer medium 122 flows down into the south cavity 46S along the longitudinal passage 45, and any displaced air/gas can escape through the longitudinal passage 45. Thus, gravity can assist in filling the south cavity 46S with the enclosure 30 inverted. The ability to inspect and/or fill one cavity 46 from the opposing end 47 may be particularly beneficial during assembly, or during maintenance (servicing), when access to one end 47 or the other of the enclosure 30 may be restricted. A further benefit is that fluid pressure of the liquid heat transfer medium 122 may be equalized between the north cavity 46N and the south cavity 46S, because the two cavities 46 are in fluid communication via the longitudinal passage 45, which may be beneficial for some situations.

The longitudinal passage longitudinal passage 45 may, in some embodiments, be the only passage through the flywheel shaft 44 that connects the cavities 46. However, in some embodiments, there may be multiple longitudinal passages 45 that connect the cavities 46. If there are multiple passages 45, care should be taken in locating them so that the flywheel assembly 40 is properly balanced, such by locating the various passages symmetrically about the flywheel axis F.

The discussion above has been in the context that the approach to cooling the bearings 50 includes a bearing cooling circuit 100 having a heat transfer shaft assembly 130. However, additional and/or alternative approaches to cooling the bearings 50 may be employed. For example, the outer race 54 may be cooled via a suitable fluid channel 220 in bearing block 58, which may be formed in part by one or more grooves 222 on the bearing block 58, and which may optionally for an additions portion of bearing cooling circuit 100. And, other known approaches to cooling the bearings 50 may be employed, such as those disclosed in U.S. Patent Application Publication 2009/0367137, the disclosure of which is incorporated herein by reference in its entirety.

Figure 9:
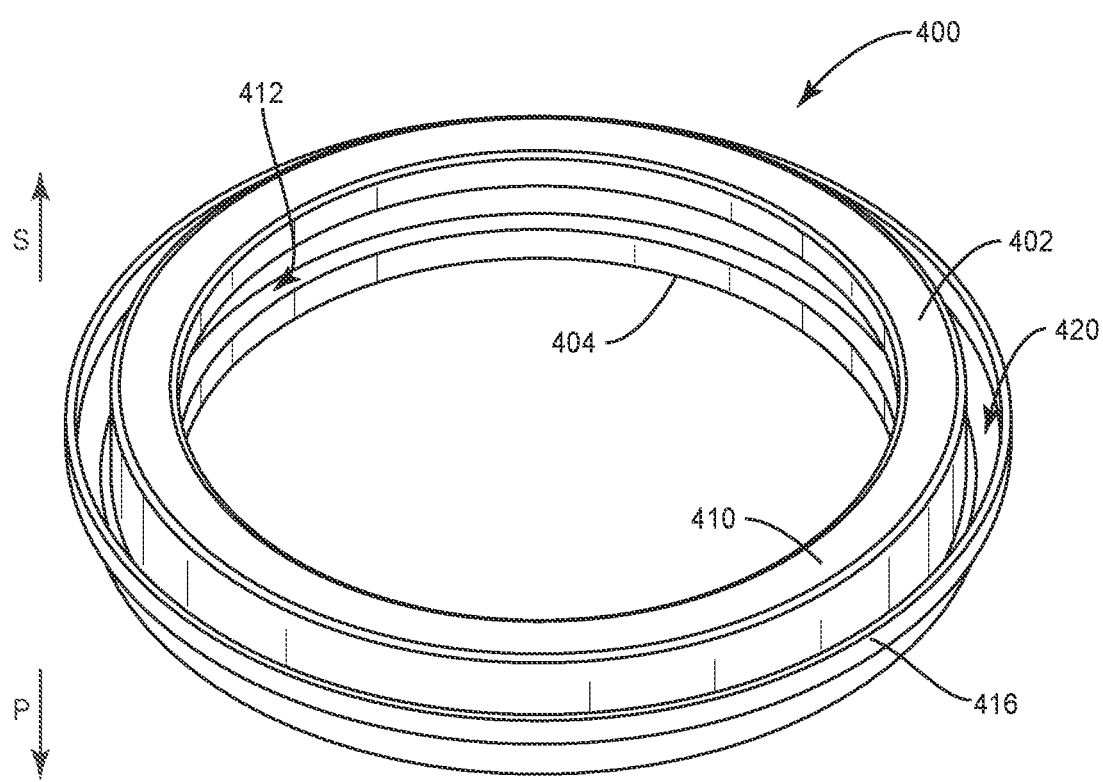
FIG. 9 shows a perspective view of an uneven seal with its optional O-ring omitted for clarity.

In some embodiments, a particularly advantageous arrangement of sealing the cavities 46 is employed. The seals employed for these embodiments are referred to herein as uneven seals 400 because they provide uneven amounts of sealing (resistance to fluid flow) in different directions. Referring to FIG. 9, an exemplary uneven seal 400 is shown. The seal 400 includes a main body 410 that is annular and a lip flange 416 extending outwardly from the main body 410. The seal 400 has a first side 402 and a second side 404. The lip flange 416 extends from the main body 410 at or near the second side 404 and curves toward the first side 402. The lip flange 416 advantageously is biased outward (either due to inherent material properties, or external forces), so that the tip zone 418 of the lip flange 416 is urged away from the main body 410 when installed. Note that relative to a hypothetical middle plane M that bisects the main body 410 normal to the central axis of the main body's central opening, the seal 400 is physically asymmetric. A pocket 420, open to the first side 402, is defined between the main body 410 and the lip flange 416. The lip flange 416 defines an outer periphery of the seal 400. The inner portion of the main body 410 optionally includes a recess 412 for receiving an optional O-ring 414. The opposing faces of the main body 410 are optionally generally flat. It is intended that the main body 410 be mounted so as to be rotationally fixed to a mounting surface (such as by friction between the main body 410 and/or O-ring 414 and mounting surface) and have the lip flange 416 deflected to be pressed against a relatively moving surface. Thus, the tip zone 418 of the lip flange 416 is the wear surface of the seal 400. The seals 400 are configured to provide asymmetric sealing such that greater resistance is provided against flow in the seal's primary sealing direction P (from a first side 402 toward a second side 404) than in the seal's secondary sealing direction S (from the second side 404 toward the first side 402). For example, a higher pressure on the first side 402 tends to urge the tip zone 418 of lip flange 416 outward (more accurately, away from the main body 410) to enhance or (further) "activate" the sealing effect. In contrast, a higher pressure on the second side 404 tends to urge the tip zone 418 of the lip flange 416 inward (more accurately, toward the main body 410), lessening the sealing effect. Thus, a given pressure drop across the seal 400 may overcome the seal 400 when the higher pressure is on the second side 404, but not overcome the seal 400 when the higher pressure is on the first side 402. In some exemplary embodiments, the sealing in the secondary sealing direction S is about ⅓ or less than the sealing in the primary sealing direction P. Thus, the ratio of the sealing in the secondary sealing direction S to the sealing in the primary sealing direction P is about 1:3 or less, or advantageously about 1:4 or less, or advantageously about 1:7 or less; or advantageously about 1:20 or less. Optionally, the seals 400 are configured to maintain a seal 400 against a pressure differential in the secondary sealing direction of about 5 psi. The seals 400 are made from suitable materials known in the art for the materials to be encountered, the desired wear characteristics, and the desired flexibility of the lip flange 416. In some embodiments, the main body 410 and lip flange 416 of the seals 400 are made from a filled PTFE blend, while the O-ring 414 is made from nitrile rubber.

Figure 11:
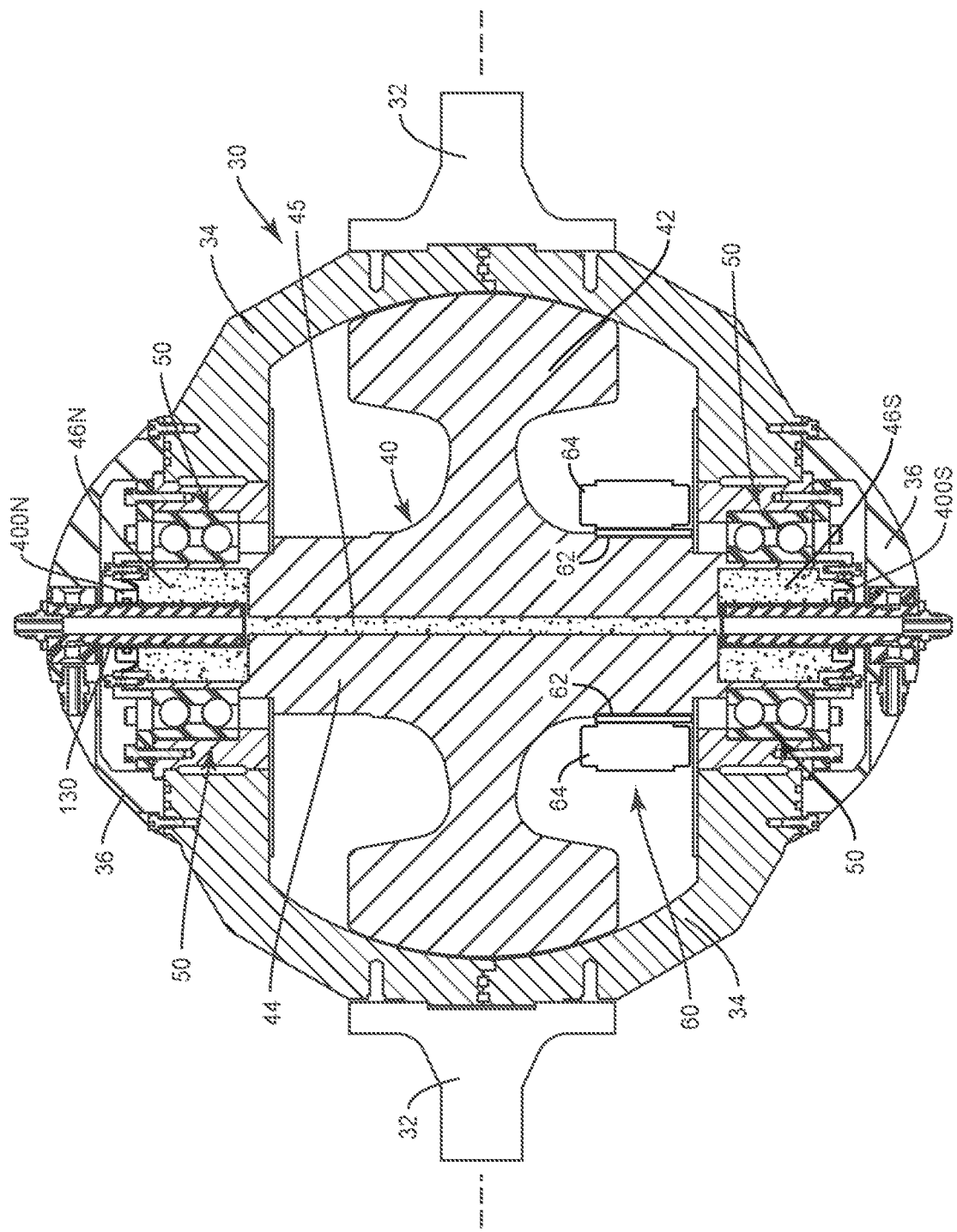
FIG. 11 shows a view similar to FIG. 3, but with seals of FIG. 9.

The uneven seals 400 are used to seal the cavities 46. For ease of reference the seal 400 associated with the north cavity 46N may be referred to as the north seal 400N, while the seal 400 associated with the south cavity 46S may be referred to as the south seal 400S. The north seal 400N and the south seal 400S may be generically referred to as seal 400. The north seal 400N is mounted on the north heat transfer shaft assembly 130 and extends between north heat transfer shaft assembly 130 and the flywheel shaft 44 to enclose the north cavity 46N. The south seal 400S is mounted on the second heat transfer shaft assembly 130 and extends between the south heat transfer shaft assembly 130 and the flywheel shaft 44 to enclose the south cavity 46S. Rather than having the first side 402 of both seals 400 face their respective cavities 46, the seals 400 have different orientations relative to their respective cavities 46. See FIG. 11. In particular, the first side 402 of the south seal 400S faces inward (north) towards the second cavity 46S, but the second side 404 of the north seal 400N faces inward (south) toward the first cavity 46N (meaning the first side 402 of the north seal 400N faces outward (north) away from the first cavity 46N). This arrangement may be referred to as "inverted seals", it being understood that the first sides 402 of the seals 400 face the same direction, so the inversion is with respect to their respective cavities 46. One result is that the south seal 400S is oriented to be better at keeping gas/fluid from exiting the south cavity 46S than fluid entering the south cavity 46S (because the primary sealing direction P of the south seal 400S is oriented to keep fluid in the south cavity 46S), but the north seal 400N is oriented to better keep gas/fluid from entering the north cavity 46N than fluid exiting the north cavity 46N (because the lesser secondary sealing direction S of the north seal 400N is oriented to keep fluid in the north cavity 46N). Note that due to the presence and effect of longitudinal passage 45, the pressures in the north cavity 46N and the south cavity 46S should be equal, disregarding any hydrostatic effects.

Figure 10:
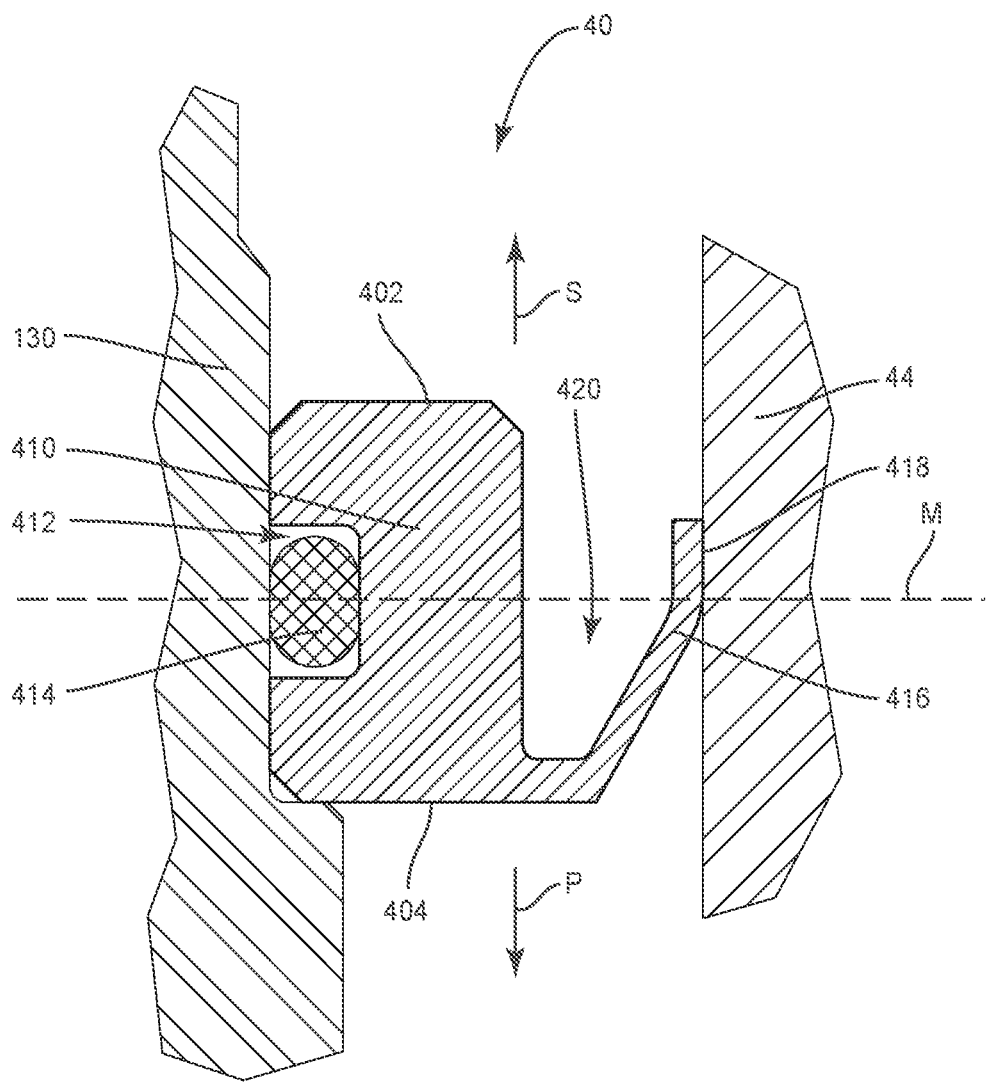
FIG. 10 shows a cross-section of the seal of FIG. 9 installed between a heat transfer shaft assembly and a flywheel shaft.

The discussion above regarding seals 400 has been in the context of the seals 400 being as shown in FIGS. 9-10. However, such configuration of seals 400 is not required for all embodiments, and the seals 400 may take any known form that provides asymmetric sealing such that greater resistance is provided against flow in a primary sealing direction P (from a first side 402 toward a second side 404) than in a secondary sealing direction S (from the second side 404 toward the first side 402).

The inverted seals arrangement, in one or more embodiments, allows control of venting of evolved gas in the cavities 46. The liquid heat transfer medium 122 may have dissolved gas therein, which when heated, may come out of solution as evolved gas. Due the heating, the evolved gas may have a pressure that is above the sealing limit of the north seal 400N in the secondary sealing direction S. If so, at least portion of the evolved gas is automatically vented past the north seal 400N, into the enclosure 30. When the pressure of the evolved gas in the north cavity 46N is lower than the sealing limit of the north seal 400N in the secondary sealing direction S (e.g., after some venting and/or when the temperature drops), the north seal 400N retains the evolved gas in the north cavity 46N, some of which may be resorbed into the liquid heat transfer medium 122. In addition, the inverted seals arrangement allows at least some of the gasses that may otherwise be trapped in the north cavity 46N during installation of the north seal 400N to be "burped" past the north seal 400N because the north seal 400N more easily allows the gasses to escape due to the lower resistance of the second sealing direction S being aligned with gas exiting than the higher resistance of the primary sealing direction P.

The inverted seals arrangement, in one more embodiments, also allows control of a pressure differential across the seals 400. When the pressure differential between the first cavity 46 and ambient pressure inside the enclosure across first seal 400 is above the resistance level of the first seal 400 in the secondary sealing direction S, fluid from the first cavity 46 is automatically vented out of the first cavity 46 past the first seal 400, while maintaining seal 400 of the second cavity 46 with the second seal 400. For a first seal 400 with a lip flange 416 as shown in FIGS. 9-10, the tip zone 418 of lip flange 416 deflects away from the wall of the flywheel shaft 44 above the first cavity 46, which allows this venting. Due to the venting, the pressure in the first cavity 46 drops, lowering the pressure differential across the first seal 400. The resistance level of the first seal 400 in the secondary sealing direction S may be considered as a first threshold. In a somewhat similar manner, action of the second seal 400 allows fluid to be automatically introduced into the second cavity 46. When the pressure differential between the second cavity 46 and ambient pressure inside the enclosure 30 across second seal 400 is above a second threshold with pressure being lower in the second cavity 46, fluid is automatically introduced into the second cavity 46 past the second seal 400, while maintaining seal 400 of the first cavity with the first uneven seal 400. For a second seal 400 with a lip flange 416 as shown in FIGS. 9-10, the tip zone 418 of lip flange 416 deflects away from the wall in the flywheel shaft 44 below the second cavity 46, which allows this fluid introduction. Due to the fluid introduction, the pressure in the second cavity 46 rises and/or the pressure in the enclosure 30 drops, lowering the pressure differential across the second seal 400. Note that the fluid being vented or introduced may be a gas, a liquid, or a combination. Further, the first and second thresholds are optionally different. For example, the first and second seals 400 are typically exposed to the same ambient pressure in the enclosure 30, but the second seal 400 has a higher pressure on the side facing the second cavity 46 because of hydrostatic pressure (assuming the second cavity 46 is below the first cavity 46). As such, while the first and second seals 400 may be identical, the first and second seals 400 advantageously are slightly different in configuration (e.g., physical dimensions of the lip flange 416) and/or material properties (e.g., durometer), so that the first and second thresholds are tailored as desired. Note that the origin of the pressure differential across one or both seals 400 may be from a variety of sources, such as thermal expansion of the liquid heat transfer medium 122, loss of seal of the enclosure 30 leading to an increase in the ambient pressure inside the enclosure, or other reasons.

Figure 12:
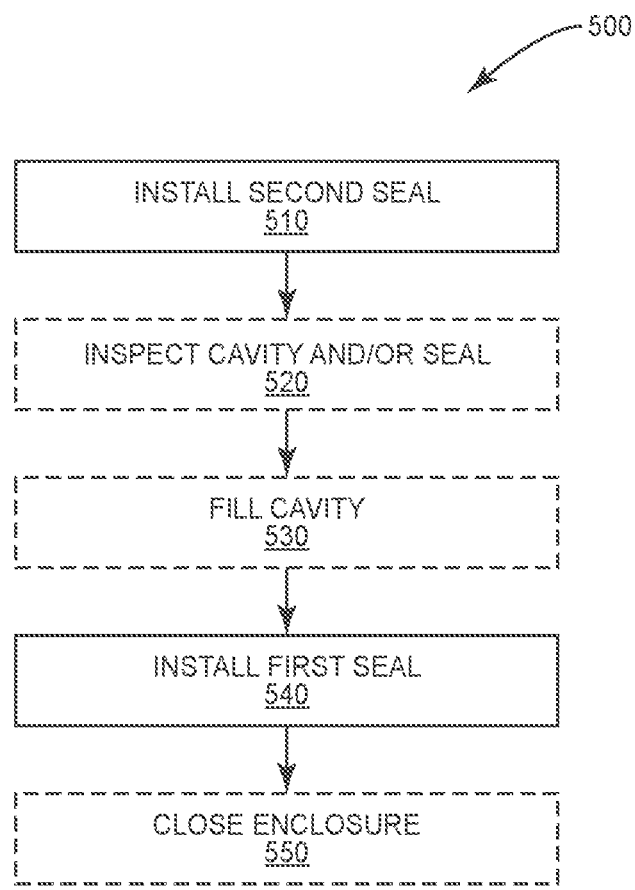
FIG. 12 shows a simplified flowchart of an exemplary method of assembling a gyroscopic roll stabilizer.

An exemplary process (500) of assembling a gyroscopic roll stabilizer 10 that includes seals 400 is shown in FIG. 12. As described above, the gyroscopic roll stabilizer 10 comprises an enclosure 30 and a flywheel assembly 40 supported in the enclosure 30 for rotation about a flywheel axis F; the flywheel assembly 40 including a flywheel shaft 44 and a flywheel 42; the flywheel shaft 44 having a first end 47 and an opposite second end 47. Again, to aid in clarity of discussion of this process, it will be assumed for this illustrative example that the first cavity 46 and seal 400 are north cavity 46N and north seal 400N, and that the second cavity 46 and seal 400 are the south cavity 46S and south seal 400S, although their roles/positions/orientations may be reversed as is desired. The process (500) includes installing (540) a first uneven seal 400 (north seal 400N) on a heat transfer shaft assembly 130 that is fixed relative to the enclosure 30 and extends into an open-ended first cavity 46 (north cavity 46N) formed in the first end 47 of the flywheel shaft 44, so that the first seal 400 extends between the first heat transfer shaft assembly 130 and the flywheel shaft 44 to enclose the first cavity 46. The process also includes installing (510) a second uneven seal 400 (south seal 400S) on a heat transfer shaft assembly 130 that is fixed relative to the enclosure 30 and extends into an open-ended second cavity 46 (south cavity 46S) formed in the second end 47 of the flywheel shaft 44, so that the second seal 400 extends between the second heat transfer shaft assembly 130 and the flywheel shaft 44 to enclose the second cavity 46. Note that the first and second cavities 46 face away from each other. The first and second seals 400 each have a respective first side 402 and an opposite second side 404. The first and second seals 400 are both configured to provide asymmetric sealing such that greater resistance is provided against flow in a primary sealing direction P (from the first side 402 toward the second side 404) than in a secondary sealing direction S (from the second side 404 toward the first side 402). The first side 402 of the second seal 400 (south seal 400S) faces inward toward the second cavity 46, and the second side 404 of the first seal 400 (north seal 400N) faces inward toward the first cavity 46. The installing (540) the first seal 400 optionally occurs after the installing (510) the second seal 400. The process optionally includes, after installing (510) the second seal 400 (south seal 400S) and prior to the installing (540) the first seal 400 (north seal 400N), inspecting (520) the second cavity (south cavity 46S) and/or the second seal 400 (south seal 400S) via the longitudinal passage 45 as described above, with the longitudinal passage 45 accessed via the first cavity 46 for the inspecting (520). The process optionally includes, after the inspecting (520) and prior to the installing (540) the first seal 400, filling (530) the second cavity 46 (south cavity 46S) with liquid heat transfer medium 122 via the longitudinal passage 45 by adding the liquid heat transfer medium 122 to the longitudinal passage 45 and/or the first cavity 46. As described above, the first and second seals 400 optionally each comprise: a) an annular main body 410 and a lip flange 416 extending outwardly from the main body 410; and b) a pocket 420 defined between the main body 410 and the lip flange 416, and open to the first side 402. Optionally, filling (530) comprises filling the pocket 420 of the second seal 400 with the liquid heat transfer medium 122. The process optionally includes, after the installing (540) the first seal 400 and the installing (510) the second seal 400, closing (550) the enclosure 30. While not required, advantageously the first end 47 is disposed below the second end 47 during the installing (510) the second seal 400, and the first end 47 is disposed above the second end 47 during the installing (540) the first seal 400.

Figure 13:
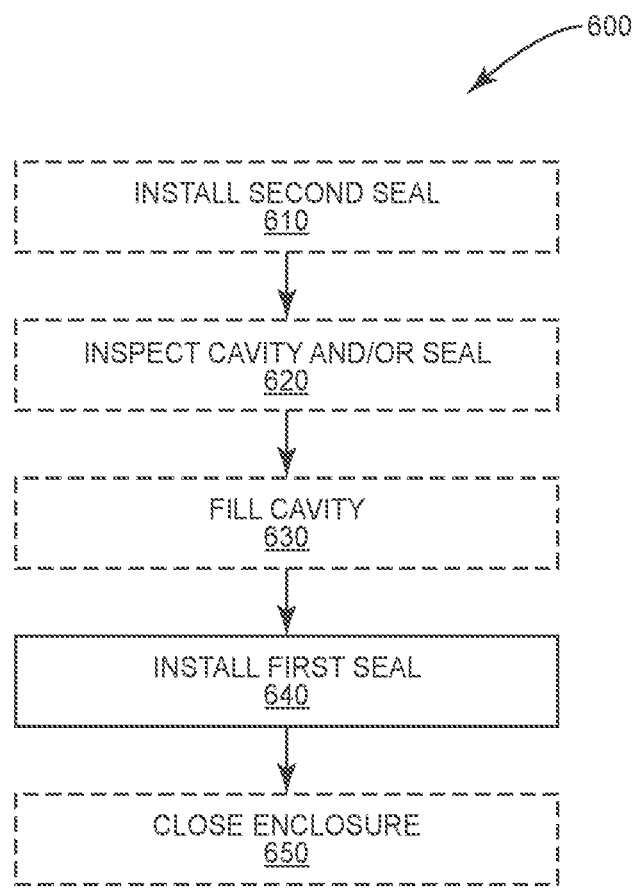
FIG. 13 shows a simplified flowchart of an exemplary method of maintaining a gyroscopic roll stabilizer.

An exemplary process (600) of maintaining (preventive maintenance and/or service maintenance) a gyroscopic roll stabilizer 10 that includes seals 400 is shown in FIG. 13. As described above, the gyroscopic roll stabilizer 10 comprises an enclosure 30 and a flywheel assembly 40 supported in the enclosure 30 for rotation about a flywheel axis F; the flywheel assembly 40 including a flywheel shaft 44 and a flywheel 42; the flywheel shaft 44 having a first end 47 and an opposite second end 47. Again, to aid in clarity of discussion of this process, it will be assumed for this illustrative example that the first cavity 46 and associated seal 400 are north cavity 46N and north seal 400N, and that the second cavity 46 and associated seal 400 are the south cavity 46S and south seal 400S, although their roles/positions/orientations may be reversed as is desired. The process (600) includes installing (640) a first uneven seal 400 (north seal 400N) on a first heat transfer shaft assembly 130 that is fixed relative to the enclosure 30 and extends into an open-ended first cavity 46 (north cavity 46N) formed in the first end 47 of the flywheel shaft 44, so that the first seal 400 (north seal 400N) extends between the first heat transfer shaft assembly 130 and the flywheel shaft 44 to enclose the first cavity 46. While the installing (640) is occurring, a second uneven seal 400 (south seal 400S) is disposed on a second heat transfer shaft assembly 130 that is fixed relative to the enclosure 30 and extends into an open-ended second cavity 46 (south cavity 46S) formed in the second end 47 of the flywheel shaft 44, so that the second seal 400 (south seal 400S) extends between the second heat transfer shaft assembly 130 and the flywheel shaft 44 to enclose the second cavity 46. Note that the first and second cavities 46 face away from each other. The first and second seals 400 each have a respective first side 402 and an opposite second side 404. The first and second seals 400 are both configured to provide asymmetric sealing such that greater resistance is provided against flow in a primary sealing direction P (from the first side 402 toward the second side 404) than in a secondary sealing direction S (from the second side 404 toward the first side 402). The first side 402 of the second seal 400 (south seal 400S) faces inward toward the second cavity 46, and the second side 404 of the first seal 400 (north seal 400N) faces inward toward the first cavity 46. The first end 47 is optionally disposed above the second end 47 during the installing the first seal 400. The process optionally includes, prior to the installing (640) the first seal 400 (north seal 400N), inspecting (620) the second cavity 46 (south cavity 46S) and/or the second seal 400 (south seal 400S) via the longitudinal passage 45 as described above, with the longitudinal passage 45 accessed via the first cavity 46 for the inspecting (620). The process optionally includes, after the inspecting (620) and prior to the installing (640) the first seal 400, filling (630) the second cavity 46 (south cavity 46S) with a liquid heat transfer medium 122 via the longitudinal passage 45 by adding the liquid heat transfer medium 122 to the longitudinal passage 45 and/or the first cavity 46. As described above, the first and second seals 400 optionally each comprise: a) an annular main body 410 and a lip flange 416 extending outwardly from the main body 410; and b) a pocket 420 defined between the main body 410 and the lip flange 416, and open to the first side 402. Optionally, filling (630) comprises filling the pocket 420 of the second seal 400 with the liquid heat transfer medium. The process optionally includes, after the installing (640) the first seal 400, closing (650) the enclosure 30. In some embodiments, the process optionally includes, prior to the installing (640) the first seal 400, installing (610) the second uneven seal 400 (south seal 400S) on the second heat transfer shaft assembly 130 so that the second seal 400 extends between the second heat transfer shaft assembly 130 and the flywheel shaft 44 to enclose the second cavity 46.

Figure 14:
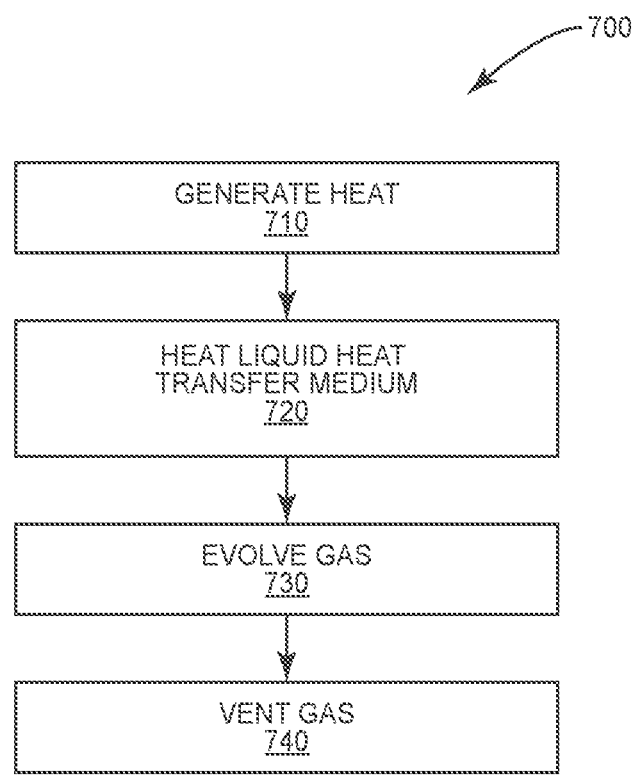
FIG. 14 shows a simplified flowchart of an exemplary method of operating a gyroscopic roll stabilizer.

An exemplary process (700) of operating the gyroscopic roll stabilizer 10 with seals 400 is shown in FIG. 14. To aid in clarity of discussion of this process, it will be assumed for this illustrative example that the first cavity 46 and seal 400 are north cavity 46N and north seal 400N, and that the second cavity 46 and seal 400 are the south cavity 46S and south seal 400S, although their roles/positions/orientations may be reversed as is desired. The process (700) includes generating (710) heat by spinning the flywheel assembly 40 about the flywheel axis F while rotating the enclosure 30, and while maintaining a below ambient pressure in the enclosure 30. The process also includes heating (720), using the generated heat, the liquid heat transfer medium 122 disposed in a first cavity 46 (north cavity 46N) formed in the first end 47 of the flywheel shaft 44. The process also includes, in response to the heating, evolving (730) dissolved gas from the liquid heat transfer medium 122. The process further includes venting (740) at least a portion of the evolved gas past a first uneven seal 400 (north seal 400N) that extends between heat transfer shaft assembly 130 (fixed relative to the enclosure 30 and extending into the first cavity 46) and the flywheel shaft 44 to enclose the first cavity 46. During the venting (740), a second uneven seal 400 (south seal 400S) remains disposed on a heat transfer shaft assembly 130 that is fixed relative to the enclosure 30 and extends into an open-ended second cavity 46 (south cavity 46S) formed in the second end 47 of the flywheel shaft 44 and facing away from the first end 47, so that the second seal 400 (south seal 400S) extends between the heat transfer shaft assembly 130 and the flywheel shaft 44 to enclose the second cavity 46. The first and second uneven seals 400 each have a respective first side 402 and an opposite second side 404. The first and second seals 400 are both configured to provide asymmetric sealing such that greater resistance is provided against flow in a primary sealing direction P (from the first side 402 toward the second side 404) than in a secondary sealing direction S (from the second side 404 toward the first side 402). The first side 402 of the second seal 400 (south seal 400S) faces inward toward the second cavity 46, and the second side 404 of the first seal 400 (north seal 400N) faces inward toward the first cavity 46. As described above, the first and second seals 400 optionally each comprise: a) an annular main body 410 and a lip flange 416 extending outwardly from the main body 410; and b) a pocket 420 defined between the main body 410 and the lip flange 416, and open to the first side 402. Optionally, the liquid heat transfer medium 122 fills the pocket 420 of the second seal 400.

Figure 15:
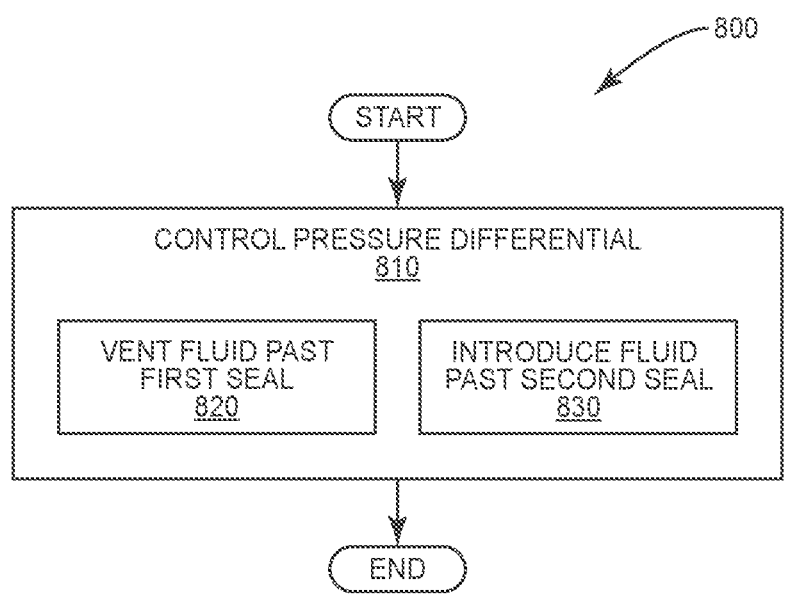
FIG. 15 shows a simplified flowchart of another exemplary method of operating a gyroscopic roll stabilizer.

Another exemplary process (800) of operating a gyroscopic roll stabilizer 10 that includes seals 400 is shown in FIG. 15. As described above, the gyroscopic roll stabilizer 10 comprises an enclosure 30 and a flywheel assembly 40 supported in the enclosure 30 for rotation about a flywheel axis F; the flywheel assembly 40 including a flywheel shaft 44 and a flywheel 42; the flywheel shaft 44 has a first end 47 and an opposite second end 47. Again, to aid in clarity of discussion of this process, it will be assumed for this illustrative example that the first cavity 46 and seal 400 are north cavity and north seal 400N, and that the second cavity 46 and seal 400 are the south cavity and south seal 400S, although their roles/positions/orientations may be reversed as is desired. The process (800) includes controlling (810) a pressure differential between the first and second cavities 46 in the flywheel assembly 40 and ambient pressure inside the enclosure 30 across the first and second seals 400. As discussed herein, the first and second seals 400 are disposed to seal the first and second cavities 46 respectively in the flywheel assembly 40. The control (810) of the pressure differential is achieved by automatically venting (820) fluid from the first cavity 46 past the first uneven seal 400 and/or introducing (830) fluid into the second cavity 46 past the second uneven seal 400. The venting (820) comprises automatically venting, in response to the pressure differential being above a first threshold with pressure being higher in the first cavity 46, fluid from the first cavity 46 past the first uneven seal 400, while maintaining seal of the second cavity 46 with the second seal 400. The introducing (830) comprises automatically introducing, in response to the pressure differential being above a second threshold with pressure being lower in the second cavity 46, fluid into the second cavity 46 past the second uneven seal 400, while maintaining seal of the first cavity 46 with the first seal 400. As discussed above, the flywheel shaft 44 has a longitudinal passage 45 connecting the first cavity 46 and the second cavity 46. The first and second seals 400 each have a respective first side 402 and an opposite second side 404. The first and second seals 400 are both configured to provide asymmetric sealing such that greater resistance is provided against flow in a primary sealing direction P (from the first side 402 toward the second side 404) than in a secondary sealing direction S (from the second side 404 toward the first side 402). The first side 402 of the second seal 400 (south seal 400S) faces inward toward the second cavity 46, and the second side 404 of the first seal 400 (north seal 400N) faces inward toward the first cavity 46. In some embodiments, the first and second thresholds are different; in some embodiments, the first and second thresholds are the same.

As mentioned above, it should be understood that the roles and positions of the north and south cavities 46 (and north and south ends 47, and the orientations of the north and south seals 400) may be reversed, as is desired.

The discussion above has generally been in the context of the heat transfer shaft assemblies 130 being affixed to the cover plates 36; however, it should be understood that in some embodiments the heat transfer shaft assemblies 130, and/or portions thereof such as the sleeves 136, are optionally integrally formed with the corresponding cover plate 36.

The discussion above has generally been in the context of the uneven seals 400 having a recess 412 and an O-ring 414 for retaining the seal 400 in place on the heat transfer shaft assembly 130. However, other approaches to mounting the seal 400 on the heat transfer shaft assembly 130 may be alternatively/additionally used. For example, an X-ring or square-ring could replace the O-ring 414; some sort of retention device like a spring clip could be employed; and/or a bump could be formed on the heat transfer shaft assembly 130 that fits in the recess 412. Thus, the use of an O-ring is not essential to practice of the invention, and any known method of securing the seal 400 in place may be employed.

The upper or north cavity 46N below seal 125 or 400N may be entirely filled with the liquid heat transfer medium 122, or may be partially filed. Partial filling may allow gas trapped between the liquid heat transfer medium 122 and the seal 125 or 400N to act conceptually as a spring for adapting to expansion/contraction of the liquid heat transfer medium 122, such as due to temperature changes.

Figure 16:
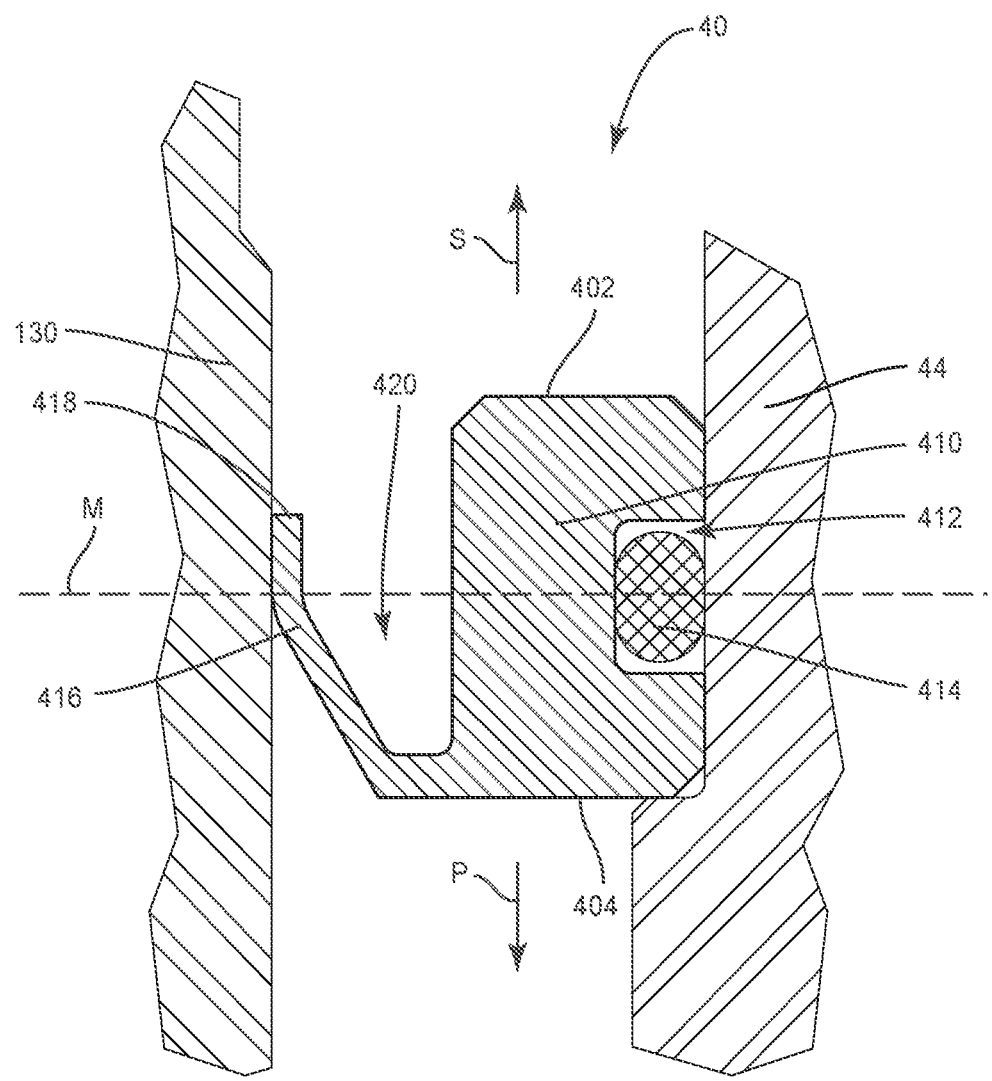
FIG. 16 shows a cross-section of the seal of FIG. 9 installed in an alternative arrangement between a heat transfer shaft assembly and a flywheel shaft.

The discussion above has generally been in the context of the uneven seals 400 being mounted to the respective heat transfer shaft assembly 130, and extending to the flywheel shaft 44 to enclose the respective cavity 46. In such an arrangement, the so-called moving sealing surface of the seal 400 (near tip 418) is against the flywheel shaft 44, and the so-called stationary surface of the seal 400 is against the corresponding heat transfer shaft assembly 130. However, an optional alternative approach for each and all of the apparatuses and methods discussed above is to have the uneven seals 400 instead mounted to the flywheel shaft 44 and extending to the respective heat transfer shaft assembly 130 to enclose the respective cavity 46, such that the moving sealing surface of the seal 400 (near tip 418) is against the respective heat transfer shaft assembly 130 rather than the flywheel shaft 44. An example of such an arrangement is shown in FIG. 16. For the FIG. 16 arrangement, the moving sealing surfaces of the seals 400 are located closer the flywheel axis F associated with the flywheel assembly 40, and therefore experience lower relative surface speeds between the moving sealing surface of the seal 400 and the corresponding surface against which the seal 400 is movably sealing against, as compared to the arrangement shown in FIG. 10. As such, the FIG. 16 arrangement may exhibit better seal life compared to the FIG. 10 arrangement, at the potential cost of lessening of sealing pressure due to centrifugal forces tending to urge the tip 418 toward, rather than away from, the seal main body 410 when the flywheel assembly 40 is rotating.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A gyroscopic roll stabilizer for a boat, the gyroscopic roll stabilizer comprising:

an enclosure mounted to a gimbal for rotation about a gimbal axis and configured to maintain a below-ambient pressure;

a flywheel assembly including a flywheel and flywheel shaft; the flywheel having a first end and an opposite second end; wherein the flywheel assembly is rotatably mounted inside the enclosure for rotation about a flywheel axis; the flywheel shaft having:
 a first open-ended cavity formed in the first end and facing away from the second end; and
 a second open-ended cavity formed in the second end and facing away from the first end;

a motor operative to rotate the flywheel assembly;

a first heat transfer shaft assembly rotationally fixed relative to the flywheel axis and extending from the enclosure into the first cavity;

a second heat transfer shaft assembly rotationally fixed relative to the flywheel axis and extending from the enclosure into the second cavity;

a first uneven seal mounted so as to extend between first heat transfer shaft assembly and the flywheel shaft to enclose the first cavity; the first uneven seal contacting both the first heat transfer shaft assembly and the flywheel shaft;

a second uneven seal mounted so as to extend between second heat transfer shaft assembly and the flywheel shaft to enclose the second cavity; the second uneven seal contacting both the second heat transfer shaft assembly and the flywheel shaft;

wherein the first and second uneven seals each have a respective first side and an opposite second side; wherein the first and second uneven seals are both configured to provide asymmetric sealing such that greater resistance is provided against flow in a primary sealing direction, from a first side toward a second side, than in a secondary sealing direction, from the second side toward the first side;

wherein the first side of the second uneven seal faces inward toward the second cavity; and wherein the second side of the first uneven seal faces inward toward the first cavity.

2. The gyroscopic roll stabilizer of claim 1, wherein the first and second uneven seals are physically asymmetric in a direction parallel to the flywheel axis.

3. The gyroscopic roll stabilizer of claim 2:
wherein the first and second uneven seals each comprise:
 an annular main body and a lip flange extending outwardly from the main body; and
 a pocket defined between the main body and the lip flange, and open to the first side;
wherein the lip flange defines an outer periphery of the corresponding seal and is biased against the flywheel shaft;
wherein the first and second uneven seals are configured such that applying a greater pressure to the first side than the second side causes the lip flange to be urged outward.

4. The gyroscopic roll stabilizer of claim 3, wherein the first and second uneven seals further comprise an O-ring disposed between the main body and the corresponding heat transfer shaft assembly.

5. The gyroscopic roll stabilizer of claim 1, wherein the first uneven seal is mounted on the flywheel shaft and presses against the first heat transfer shaft assembly.

6. The gyroscopic roll stabilizer of claim 1, wherein the flywheel shaft has a longitudinal passage connecting the first cavity and the second cavity.

7. The gyroscopic roll stabilizer of claim 6, further comprising a liquid heat transfer medium disposed in the first cavity, the second cavity, and the longitudinal passage.

8. The gyroscopic roll stabilizer of claim 6, wherein there is only one longitudinal passage through the flywheel shaft from the first cavity to the second cavity.

9. The gyroscopic roll stabilizer of claim 1, wherein the first end is disposed above the second end.

10. The gyroscopic roll stabilizer of claim 1, wherein the flywheel and the flywheel shaft are integrally formed with one another.

11. A method of assembling a gyroscopic roll stabilizer for a boat; wherein the gyroscopic roll stabilizer comprises an enclosure and a flywheel assembly supported in the enclosure for rotation about a flywheel axis; the flywheel assembly including a flywheel shaft and a flywheel; the flywheel shaft having a first end and an opposite second end; the method comprising:
installing a first uneven seal between the flywheel shaft and a first heat transfer shaft assembly that is fixed relative to the enclosure and extends into an open-ended first cavity formed in the first end of the flywheel shaft, so that the first uneven seal extends between the first heat transfer shaft assembly and the flywheel shaft to enclose the first cavity, and the first uneven seal contacts both the first heat transfer shaft assembly and the flywheel shaft;
installing a second uneven seal between the flywheel shaft and a second heat transfer shaft assembly that is fixed relative to the enclosure and extends into an open-ended second cavity formed in the second end of the flywheel shaft, so that the second uneven seal extends between the second heat transfer shaft assembly and the flywheel shaft to enclose the second cavity, and the second uneven seal contacts both the second heat transfer shaft assembly and the flywheel shaft;
wherein the first and second cavities face away from each other;
wherein the first and second uneven seals each have a respective first side and an opposite second side; wherein the first and second uneven seals are both configured to provide asymmetric sealing such that greater resistance is provided against flow in a primary sealing direction, from the first side toward the second side, than in a secondary sealing direction, from the second side toward the first side;
wherein the first side of the second uneven seal faces inward toward the second cavity;
wherein the second side of the first uneven seal faces inward toward the first cavity.

12. The method of claim 11, wherein the installing the first uneven seal occurs after the installing the second uneven seal.

13. The method of claim 11:
wherein the flywheel shaft has a longitudinal passage connecting the first cavity and the second cavity;
further comprising, after installing the second uneven seal and prior to the installing the first uneven seal, inspecting the second cavity and/or the second uneven seal via the longitudinal passage; wherein the longitudinal passage is accessed via the first cavity for the inspecting.

14. The method of claim 13, further comprising, after the inspecting and prior to the installing the first uneven seal, filling the second cavity with a liquid heat transfer medium via the longitudinal passage by adding the liquid heat transfer medium to the longitudinal passage and/or the first cavity.

15. The method of claim 13, further comprising adjusting or replacing the second uneven seal based on the inspecting.

16. The method of claim 14:
wherein the first and second uneven seals each comprise:
an annular main body and a lip flange extending outwardly from the main body; and
a pocket defined between the main body and the lip flange, and open to the first side;
wherein the filling comprises filling the pocket of the second uneven seal with the liquid heat transfer medium.

17. The method of claim 11, further comprising, after the installing the first uneven seal and the installing the second uneven seal, closing the enclosure.

18. The method of claim 11:
wherein the first end is disposed below the second end during the installing the second uneven seal; and
wherein the first end is disposed above the second end during the installing the first uneven seal.

\* \* \* \* \*